(12) United States Patent
Baschy

(10) Patent No.: US 9,129,088 B1
(45) Date of Patent: Sep. 8, 2015

(54) USER INTERFACE DRIVEN ACCESS CONTROL SYSTEM AND METHODS FOR MULTIPLE USERS AS ONE AUDIENCE

(76) Inventor: Leo Martin Baschy, Copperopolis, CA (US)

( * ) Notice: Subject to any disclaimer, the term of this patent is extended or adjusted under 35 U.S.C. 154(b) by 1974 days.

(21) Appl. No.: 11/308,989

(22) Filed: Jun. 4, 2006

Related U.S. Application Data

(60) Provisional application No. 60/595,086, filed on Jun. 4, 2005, provisional application No. 60/595,742, filed on Aug. 2, 2005.

(51) Int. Cl.
*G06F 7/04* (2006.01)
*G06F 15/16* (2006.01)
*G06F 21/10* (2013.01)
*G06Q 10/10* (2012.01)

(52) U.S. Cl.
CPC .............. *G06F 21/10* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 5,379,423 A | 1/1995 | Mutoh et al. | |
| 5,550,968 A | 8/1996 | Miller et al. | |
| 5,675,782 A | 10/1997 | Montague et al. | |
| 5,708,780 A | 1/1998 | Levergood et al. | |
| 5,742,759 A | 4/1998 | Nessett et al. | |
| 5,760,917 A | 6/1998 | Sheridan | |
| 5,761,669 A | 6/1998 | Montague et al. | |
| 5,929,854 A | 7/1999 | Ross | |
| 6,101,480 A | 8/2000 | Conmy et al. | |
| 6,154,741 A | 11/2000 | Feldman | |
| 6,185,684 B1 | 2/2001 | Pravetz et al. | |
| 6,202,066 B1 * | 3/2001 | Barkley et al. | 707/785 |
| 6,205,476 B1 | 3/2001 | Hayes, Jr. | |
| 6,233,618 B1 | 5/2001 | Shannon | |
| 6,393,468 B1 | 5/2002 | McGee | |
| 6,493,731 B1 * | 12/2002 | Jones et al. | 715/234 |
| 6,502,102 B1 | 12/2002 | Haswell et al. | |
| 6,523,027 B1 | 2/2003 | Underwood | |
| 6,711,687 B1 | 3/2004 | Sekiguchi | |
| 6,738,973 B1 | 5/2004 | Rekimoto | |
| 6,768,999 B2 | 7/2004 | Prager et al. | |
| 6,950,943 B1 | 9/2005 | Bacha et al. | |
| 6,990,631 B2 | 1/2006 | Narahara | |
| 7,051,282 B2 | 5/2006 | Marcjan | |

(Continued)

FOREIGN PATENT DOCUMENTS

| | | |
|---|---|---|
| JP | 2011-186818 A | 9/2011 |
| WO | WO/2004/010258 | 1/2004 |

OTHER PUBLICATIONS

Eswaran Subrahmanian, n-dim group Project LIRE, http://www.ndim.edrc.cmu.edu/papers/lire.htm.

(Continued)

*Primary Examiner* — Kaveh Abrishamkar

(57) ABSTRACT

An "audience" object describes a collection of users who are known to or expected to view a display. Access control and processing of access dependent contents for an audience are implemented so that information before being displayed is limited to what is authorized for every member in the audience to access. An operator can preview what an expected audience would see. The operator is aided in determining what the effects would be of a newcomer joining an audience. The operator is aided in determining who in an audience causes a difference in authorization. Hardware can be tied in with the access control software.

42 Claims, 23 Drawing Sheets

(56) References Cited

U.S. PATENT DOCUMENTS

| | | | |
|---|---|---|---|
| 7,079,177 | B2 | 7/2006 | Okazaki et al. |
| 7,089,530 | B1 | 8/2006 | Dardinski et al. |
| 7,272,639 | B1 | 9/2007 | Levergood et al. |
| 7,272,815 | B1 | 9/2007 | Eldridge et al. |
| 7,287,227 | B2 | 10/2007 | Ries et al. |
| 7,305,624 | B1 | 12/2007 | Siegel |
| 7,437,468 | B2 | 10/2008 | Yamamoto et al. |
| 8,223,134 | B1 | 7/2012 | Forstall et al. |
| 2001/0037379 | A1 | 11/2001 | Livnat |
| 2001/0052003 | A1 | 12/2001 | Seki et al. |
| 2002/0070865 | A1* | 6/2002 | Lancos et al. ............ 340/573.1 |
| 2002/0099837 | A1 | 7/2002 | Oe et al. |
| 2002/0141639 | A1 | 10/2002 | Steinberg |
| 2002/0162002 | A1* | 10/2002 | Gunter et al. ............... 713/176 |
| 2002/0167538 | A1 | 11/2002 | Bhetanabhotla |
| 2002/0184160 | A1 | 12/2002 | Tadayon et al. |
| 2003/0061087 | A1 | 3/2003 | Srimuang et al. |
| 2003/0164856 | A1 | 9/2003 | Prager et al. |
| 2003/0236996 | A1 | 12/2003 | Himmel et al. |
| 2004/0019799 | A1 | 1/2004 | Vering et al. |
| 2004/0054790 | A1 | 3/2004 | Himmel et al. |
| 2004/0103202 | A1 | 5/2004 | Hildebrand et al. |
| 2004/0117194 | A9 | 6/2004 | Lee et al. |
| 2004/0135805 | A1 | 7/2004 | Gottsacker et al. |
| 2004/0193606 | A1 | 9/2004 | Arai et al. |
| 2004/0267746 | A1 | 12/2004 | Marcjan et al. |
| 2004/0267871 | A1 | 12/2004 | Pratley et al. |
| 2005/0028080 | A1 | 2/2005 | Challenger et al. |
| 2005/0097440 | A1* | 5/2005 | Lusk et al. ................ 715/500.1 |
| 2005/0138566 | A1 | 6/2005 | Muller et al. |
| 2005/0198139 | A1* | 9/2005 | Malkin et al. ................ 709/205 |
| 2005/0211784 | A1 | 9/2005 | Justin |
| 2006/0041460 | A1* | 2/2006 | Aaron ............................. 705/8 |
| 2006/0059462 | A1 | 3/2006 | Yamamoto |
| 2006/0080432 | A1* | 4/2006 | Spataro et al. ............... 709/224 |
| 2006/0101341 | A1 | 5/2006 | Kelly et al. |
| 2006/0106802 | A1 | 5/2006 | Giblin et al. |
| 2006/0117382 | A1 | 6/2006 | Karabulut |
| 2006/0155705 | A1 | 7/2006 | Kamper et al. |
| 2006/0168529 | A1* | 7/2006 | Rokosz et al. ............... 715/751 |
| 2006/0195520 | A1* | 8/2006 | Stevens et al. ............... 709/204 |
| 2006/0292537 | A1 | 12/2006 | Nute et al. |
| 2007/0050362 | A1 | 3/2007 | Low et al. |
| 2007/0055775 | A1* | 3/2007 | Chia ............................ 709/225 |
| 2007/0058730 | A1 | 3/2007 | Bowra et al. |
| 2007/0198637 | A1* | 8/2007 | Deboy et al. ................ 709/204 |
| 2007/0203980 | A1* | 8/2007 | Andersen ..................... 709/204 |

OTHER PUBLICATIONS

Unknown, Obiki documentation of the Access Control Tab, http://www.obiki.org/docs/accesscontrol.html.
Johannes Helmig, Windows XP Access control via Security, Dec. 9, 2001, http://www.windowsnetworking.com/articles_tutorials/wxp-pfsec.html.
Microsoft, Use access control to restrict who can use your files, Windows XP Professional, Aug. 24, 2001, http://www.microsoft.com/windowsxp/using/security/learnmore/accesscontrol.mspx.
Ka-Ping Yee, User Interaction Design for Secure Systems.
Tara Whalen et al, User Experiences with Sharing and Access Control, 2006, ACM 1-59593-298-4/06/0004.
Leo Baschy, Researched History of SubEthaEdit Software, May 13, 2008.
Agapow et al, Wikipedia article on Role Based Access Control, Jun. 16, 2011, http://en.wikipedia.org/wiki/Rbac.
David Nagel interview, Changing Lives Through Technology, ACM Ubiquity, vol. 5, Issue 6, Apr. 7-13, 2004.
Google search for the exact wording or phrase "access-control-discontinuous hyperlink", Jun. 30, 2010.
Google search for the exact wording or phrase "discontinuous hyperlink", Jun. 29, 2010.
Roy A. Ruddle et al, The effects of hyperlinks on navigation in virtual environments, International Journal of Human-Computer Studies, vol. 53, Issue 4, Oct. 2000, pp. 551-581, ISSN:1071-5819.
David Vronay, Why Google+ is still not working for humans, Apr. 18, 2012, http://dvronay.blogspot.com/2012/04/why-google-is-still-not-working-for.html.
Tim Berners-Lee, Information Management: A Proposal, CERN, Mar. 1989, http://www.w3.org/History/1989/proposal-msw.html.
Unknown, Wikipedia article on Visual Display Unit, Jun. 24, 2012, http://en.wikipedia.org/wiki/Visual_display_unit.
Unknown, Wikipedia article on False Premise, Mar. 16, 2012, http://en.wikipedia.org/wiki/False_premise.
Small Wonders Software, Security Explorer Data Sheet, Mar. 31, 2004.
Quest Software, Inc., Quest Security Explorer Data Sheet, Jul. 27, 1012, http://www.quest.com/Quest_Site_Assets/PDF/Quest-Security-Explorer-Datasheet.pdf.
Quest Software, Inc., Quest Security Explorer Tour, Jul. 27, 1012, http://www.quest.com/security%2Dexplorer/walkthrough/default.html.
Internet Business Corporation PTY Ltd, Verdi CMS—Granular Permissions, Jul. 27, 2012, http://www.verdicms.com/3/36/4/granular_permissions.pm.
Chris Newman, Re: need review for draft-ietf-ldapext-acl-reqts-01.txt, Apr. 14, 1999, http://lists.w3.org/Archives/Public/ietf-discuss/1999Apr/0005.html.
S. Shepler et al, IETF RFC 3010—NFS version 4 Protocol, Dec. 2000.
S. Shepler et al, IETF RFC 3530—Network File System NFS version 4 Protocol, Apr. 2003.
G. Clemm et al, IETF RFC 3744—Web Distributed Authoring and Versioning WebDAV Access Control Protocol, May 2004.
E. Stokes et al, IETF RFC 2820—Access Control Requirements for LDAP, May 2000.
J. Myers, IETF RFC 2086—IMAP4 ACL extension, Jan. 1997.
Craig R. McClanahan, Authentication and Access Control for Web Applications, JavaOne Session #1291, Jun. 2001.
Nataraj Nagaratnam et al, The Security Architecture for Open Grid Services, Jul. 17, 2002.
David Becker, Software makers ready desktop lockdown, Apr. 20, 2004, http://news.cnet.com/2100-1001_3-5194756.html.
Bruce Chizen interview, Getting Reorganization Right: How Bruce Chizen Drove Change and Innovation at Adobe Systems, Knowledge@Wharton, Apr. 21, 2004.
Cutcom Software Inc., SentryFile Brochure, Jul. 28, 2012, http://www.sentryfile.com/download/sf5_brochureAutoCapture.pdf.
Cutcom Software Inc., SentryFile screen shots, Jul. 18, 2006, http://www.sentryfile.com/index.cfm ? index=PRODUCT/SCREEN_SHOTS.
Cutcom Software Inc., SentryFile screen shots, Jan. 24, 2004, http://web.archive.org/web/20040306064540/ http://www.sentryfile.com/index.cfm ? index=PRODUCT/SCREEN_SHOTS.
Unknown, Wikipedia article on Health Insurance Portability and Accountability Act, Aug. 3, 2012, http://en.wikipedia.org/wiki/Health_insurance_Portability_and_Accountability_Act.
Unknown, Wikipedia article on Electronic health record, Aug. 3, 2012, http://en.wikipedia.org/wiki/Electronic_health_record.
Unknown, Wikipedia article on Personal health record, Aug. 3, 2012, http://en.wikipedia.org/wiki/Personal_health_record.
Healthcare Information and Management Systems Society—HIMSS, Defining and Testing EMR Usability, Jun. 2009, http://www.himss.org/content/files/HIMSS_DefiningandTestingEMRUsability.pdf.
David Nagel email, Re: results of 7 years User Interface for Access Control, Sep. 6, 2005.
Bryan Kaufman email, Re: HIPAA, EHR, and User Interface Driven Access Control, Aug. 3, 2012.
Unknown, Wikipedia article on Group in computing, Sep. 30, 2012, http://en.wikipedia.org/wiki/Group_%28computing%29.
Unknown, Wikipedia article on Audience, Sep. 30, 2012, http://en.wikipedia.org/wiki/Audience.
Unknown, Wikipedia article on Filename, Apr. 30, 2013, http://en.wikipedia.org/wiki/Filename.
Unknown, Wikipedia article on Variable in computer science, May 1, 2013, http://en.wikipedia.org/wiki/Variable_%28computer_science%29.

(56) References Cited

OTHER PUBLICATIONS

Unknown, Wikipedia article on Tooltip, May 2, 2013, http://en.wikipedia.org/wiki/Tooltip.

Google search for the words "broken hyperlink", May 24, 2013.

Unknown, Webopedia Computer Dictionary entry for "broken hyperlink", May 24, 2013, http://www.webopedia.com/TERM/B/broken_hyperlink.html.

Unknown, Object Management Group article "Verlying Hyperlinks", May 21, 2012, http://www.omg.org/tutorial/list_broken_hyperlinks.htm.

Microsoft Corporation, So that's how! Great FrontPage features sections 16 and 17, May 24, 2013, http://office.microsoft.com/en-us/training/fix-broken-hyperlinks-RZ006197816.aspx ? section=16.

A. Aimar et al., WebLinker, a tool for managing WWW cross-references, Computer Networks and ISDN Systems 28 1995 99-107, Jan. 1995.

D. Ingham et al., Fixing the Broken-Link problem: the W3Objects approach, Computer Networks and ISDN Systems 28 1996 1255-1268, Jan. 1996.

Brokenlinkcheck.com Website, Fehlermeldungen, Mar. 26, 2004, https://web.archive.org/web/20040326053617/http://brokenlinkcheck.com/.

Sri Atluru et al., English Language & Usage Stack Exchange, Jun. 9, 2011, http://english.stackexchange.com/questions/29141/.

Fumblefingers et al., English Language & Usage Stack Exchange, Feb. 26, 2012, http://english.stackexchange.com/questions/59292/.

Barrie England et al., English Language & Usage Stack Exchange, Jan. 23, 2012, http://english.stackexchange.com/questions/55686/.

* cited by examiner

Adam's display

Adam, Brian, and
Craig together as
audience's display

Adam's display

Adam's Responsibilities
- chassis
- suspension
- axles
- rims
- tires
- breaks
- bumpers
- motor
- transmission
- muffler
- hood
- windshield
- doors
- roof
- trunk
- radiator

Figure 3

Brian's display

Adam's Responsibilities
- chassis
- rims
- tires
- bumpers
- hood
- windshield
- doors
- roof
- trunk

Figure 4

Craig's display

Adam's Responsibilities
- chassis
- suspension
- axles
- rims
- breaks
- bumpers
- motor
- transmission
- muffler
- hood
- doors
- roof
- trunk

Figure 5

Adam, Brian, and Craig together as audience's display

Adam's Responsibilities
- chassis
- rims
- bumpers
- hood
- doors
- roof
- trunk

Figure 6

| Adam's display | Brian's display | Craig's display | Adam, Brian, and Craig together as audience's display |
|---|---|---|---|
| Adam's Responsibilities<br>• chassis<br>• suspension<br>• axles<br>• rims<br>• tires<br>• breaks<br>• bumpers<br>• motor<br>• transmission<br>• muffler<br>• hood<br>• windshield<br>• doors<br>• roof<br>• trunk<br>• radiator | Adam's Responsibilities<br>• chassis<br><br><br>• rims<br>• tires<br><br>• bumpers<br><br><br><br>• hood<br>• windshield<br>• doors<br>• roof<br>• trunk | Adam's Responsibilities<br>• chassis<br>• suspension<br>• axles<br>• rims<br><br>• breaks<br>• bumpers<br>• motor<br>• transmission<br>• muffler<br>• hood<br><br>• doors<br>• roof<br>• trunk | Adam's Responsibilities<br>• chassis<br><br><br>• rims<br><br><br>• bumpers<br><br><br><br>• hood<br><br>• doors<br>• roof<br>• trunk |

Figure 7

Adam, Brian, Craig, and David together as audience's display

Adam's Responsibilities

- bumpers

- hood
- doors
- roof
- trunk

Figure 10

David's display

Adam's Responsibilities

- bumpers

- hood
- windshield
- doors
- roof
- trunk

Figure 9

Adam, Brian, and Craig together as audience's display

Adam's Responsibilities

- chassis

- rims

- bumpers

- hood
- doors
- roof
- trunk

Figure 8

Adam, Brian, and Craig together as audience's display

Adam's Responsibilities
- chassis

- rims

- bumpers

- hood

- doors
- roof
- trunk

Figure 11

Eric's display

Adam's Responsibilities
- chassis
- suspension
- axles
- rims

- breaks
- bumpers
- motor
- transmission

- hood

- doors
- roof
- trunk

Figure 12

Adam, Brian, Craig, and Eric together as audience's display

Adam's Responsibilities
- chassis

- rims

- bumpers

- hood

- doors
- roof
- trunk

Figure 13

USER INTERFACE DRIVEN ACCESS CONTROL SYSTEM AND METHODS FOR MULTIPLE USERS AS ONE AUDIENCE

RELATED APPLICATIONS

This application claims priority from U.S. Provisional Application Ser. No. 60/595,086 filed Jun. 4, 2005 by Baschy, entitled "User Interface Driven Access Control For Multiple Users As One Audience", the contents of which is hereby incorporated by reference.

This application also claims priority from U.S. Provisional Application Ser. No. 60/595,742 filed Aug. 2, 2005 by Baschy, entitled "User Interface Driven Access Control System And Method For Multiple Users As One Audience", the contents of which is hereby incorporated by reference.

The present invention has been developed and hence can be understood more easily when knowing the invention described in U.S. patent application Ser. No. 10/802,658 filed Mar. 17, 2004 on behalf of Baschy, entitled "User Interface Driven Access Control System and Method", published Dec. 2, 2004 as U.S. Patent Application Pub. No. 2004/0239700, the disclosure of which is hereby incorporated by reference in its entirety.

The present invention has been developed and hence can be understood more easily when knowing the invention described in U.S. patent application Ser. No. 11/308,636 filed Apr. 15, 2006 by Baschy, entitled "User Interface For Non-uniform Access Control System and Methods", the disclosure of which is hereby incorporated by reference in its entirety.

FIELD OF THE INVENTION

The present invention is a method for further improving the ease of use of access control systems employed in computer information storage, retrieval, transmission, and creation.

BACKGROUND OF THE INVENTION

There are a number of access control systems, which often have been difficult enough to hinder their use. Systems as described in aforementioned patent application Ser. No. 10/802,658 can lead to better use of access control systems, specifically to a great increase in varying access control settings for different documents. Systems as described in aforementioned patent application Ser. No. 11/308,636 can lead to safer use of references in documents under access control, and in doing so to a noticeable share of documents which contain and are processed for access dependent contents.

Consequentially there would be documents and collections of documents that should appear with less than their complete contents when accessed by people outside their organizational origin.

People, as generally known, have meetings. In meetings they get together at a physical location. Being together in one room, several or many of them can view the same single display at the same time. This is beneficial in most cases, productivity enhancing, and should not be done away with.

BRIEF DESCRIPTION OF THE INVENTION

The present invention provides easy to use methods for ensuring that multiple users who are present and who are viewing a single display are presented with information only that they are authorized to access, while nevertheless showing as much information as possible, putting into place the right measure of restrictions in order to achieve desired access control, and hereby enabling better cooperation without unduly putting information at risk.

BRIEF DESCRIPTION OF THE DRAWINGS

FIG. 3 shows (abbreviated entries for) the table of contents as Adam sees it himself, when he is working by himself.

FIG. 4 shows (abbreviated entries for) the table of contents as Brian sees it, when he is accessing it by himself.

FIG. 5 shows (abbreviated entries for) the table of contents as Craig sees it, when he is accessing it by himself.

FIG. 6 shows (abbreviated entries for) the table of contents as Adam, Brian, and Craig see it together as audience when using the present invention.

FIG. 7 shows horizontal lines connecting items which pass logical AND operations combining Adam's, Brian's, and Craig's access rights in order to appear in the resulting audience's table of contents.

FIG. 8 shows the same as FIG. 6 (albeit adjusted vertically).

FIG. 9 shows the table of contents as David sees it (albeit adjusted vertically) when he is accessing it by himself.

FIG. 10 illustrates that in case David is allowed to join the meeting of Adam, Brian, and Craig then the display of the audience's table of contents must change to show even fewer items.

FIG. 11 shows the same as FIG. 8.

FIG. 12 shows the table of contents as Eric sees it (albeit adjusted vertically) when he is accessing it by himself.

FIG. 13 illustrates that in case Eric joins the meeting of Adam, Brian, and Craig then the display of the audience's table of contents should remain the same.

DETAILED DESCRIPTION OF THE INVENTION

Figure 1:
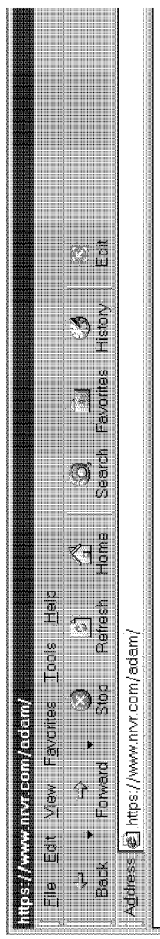
FIG. 1 shows Adam's personal table of contents as he sees it himself, when he is working by himself.

Problems arise when a person who is (has been) identified (logged in) to the computer system as a specific user (commonly as himself) accesses and causes display of a document or a collection of documents for which other people who are present have been set to have lesser access rights than the identified user, for whom access rights have been determined.

If one's imagination doesn't overflow already with possible example scenarios, a good starter might be trying to imagine a technical company that has competing clients (or component suppliers). These clients (or suppliers) each are different, their own product lines are different but related, and their interaction with the company is different. Then, one morning, one client (or supplier) sends in their engineering team for a meeting. Obviously it is desirable to pull up relevant technical and business documents during discussions. Yet, neither highly confidential internal design documents nor too much or any information about competitors should be revealed. This isn't an easy meeting to host for the person at the technical company (who is responsible for displaying documents). Is he going to be able to participate well focused on technical or business topics, potentially inappropriately disclosing information, or will his concern for access control render him a less capable participant of the meeting?

It is possible to formally discuss all aspects of the present invention. Yet, to understand the whole, without straining one's attention span with details, it may be best to informally follow the path that has led to its inception, and to sketch its key concept.

One could summarize at least part of the invention in aforementioned patent application Ser. No. 10/802,658 like this: "Make it practical to keep showing next to a document faces of those who are allowed to access it and who have accessed it. Use dragging and dropping of people's icons to allow and to deny access."

If used, one consequence could be an increased variety of access control settings.

To alleviate some consequences of increased variety of access control settings, aforementioned patent application Ser. No. 10/802,658 in section "Access Dependent Contents" presents "access dependent contents".

An even more detailed look at consequences of increased variety of access control settings is presented in aforementioned patent application Ser. No. 11/308,636. It discusses "discontinuous hyperlinks" and introduces better user interface for operators to work with discontinuous hyperlinks more efficiently while enabling responsible and correct handling of access controlled information. In doing so, aforementioned patent application Ser. No. 11/308,636 presents user interface for working with "access dependency settings".

If used, there could not only be an increased variety of access control settings, but also a noticeable share of documents which contain and are processed for access dependent contents.

One could explore different kinds of real uses where access dependent contents will become prevalent. Many professions, industries, and organizations will have typical uses. If, however, they were used as examples in this disclosure they could be distracting by their respective interesting contents or features (just as certain kinds of samples could be distracting in a disclosure about image processing).

For the sake of a comprehensible discussion then, a rather generic use of access dependent contents is:

A person's personal table of contents of what he is working on, projects, interests, and other items.

In apparent contradiction to the idea of a table of contents, however, very easily in anyone's professional and personal life there can be projects and there can be data that shouldn't be shared with everyone.

Access control settings for documents about such projects or containing such data should be set to reflect their intended audience. Access control aside, an organized, efficient, or reasonable person still would want a single document functioning as table of contents of what he is and has been working on.

Access dependent contents allows having a table of contents which per selected elements reflects access control settings of the documents it is linking to: Each user then is given only such portions of the table of contents as match the documents he is authorized to access.

To be sure, such table of contents can be as terse as a book's table of contents, or as verbose as an essay, as its author wishes. Before the introduction of access dependent contents, such table of contents could have been problematic when trying to use it when working with other people. Some entries in the table of contents probably would have given away hints about some information that shouldn't have been shared with some of the people accessing it.

If implemented as described so far, access control per document and access dependent contents within documents can work well; in real uses they can fulfill multiple purposes.

Beyond what has been described so far, the present invention newly addresses use scenarios that apparently have not been addressed adequately (or not at all) in any prior art: What to do when multiple users at the same time are or will be viewing a single display of documents under access control, including access dependent contents?

The present invention introduces the concept of "audience". This being a less formal section of this disclosure, "audience" gradually can be introduced by examples.

Figure 2:
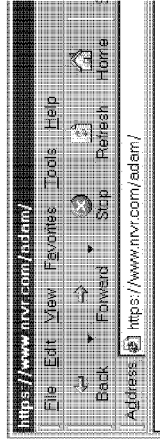
FIG. 2 shows Adam's personal table of contents as Adam, Brian, and Craig see it together as audience in a meeting when using the present invention

FIG. 1 shows Adam's personal table of contents as he would see it. FIG. 2 shows Adam's personal table of contents as Adam, Brian, and Craig would see it if they were looking at it together in a meeting.

FIGS. 3 to 13 of this disclosure show abbreviated entries per list item, in order to fit several versions next to each other, in order to facilitate comparison.

FIGS. 7 to 13 of this disclosure have been adjusted vertically in order to show corresponding list items at the same vertical coordinates, in order to facilitate comparison.

"Audience" according to the American Heritage Dictionary 3rd edition 1992 is: 1a. The spectators or listeners assembled at a performance, for example, or attracted by a radio or television program. b. The readership for printed matter, as for a book.

For this disclosure, example audiences are people coming together in a meeting room who can view a display hardware unit connected to the computer of the person hosting the meeting, Adam.

A personal table of contents can become not so private for more than one good reason. In a meeting room it can be on display for any amount of time when its owner needs to traverse his realm of information.

In this disclosure, Adam, Brian, Craig, David, and Eric are automotive engineers working in product design and development, for different companies, which are based in different countries. The example meeting is at a shared development facility. While Adam is heading the meeting it is NOT a meeting where he presents information at an audience that listens, accepts, and follows. Instead, it is a cooperative meeting to work on ongoing projects, to which each engineer contributes. It is a meeting in which attendees are expected to participate.

Adam couldn't predict every detail of what will be discussed. It could have been possible to narrow down the scope of the meeting through formalities, through preparatory emails. But these engineers don't write long emails. They design product, they test product, and they show up for meetings.

All that said, one should be able to understand: When these engineers need to look up reference data, when they need to pull up spreadsheets, performance graphs, blueprints, standard documents, regulations, specifications, etc, related to their ongoing projects, they will be greatly helped in their flow of communication during the meeting if Adam can access his personal table of contents and they can rapidly retrieve and display related documents by following chains of links that originate from his personal table of contents. His personal table of contents is a reflection of his personal work experience. His ability to share, to bring his personal table of contents into the meeting, is part of his contribution to the shared development effort that has brought together him and his peers from other companies.

FIG. 1 shows what Adam has written and sees as his personal table of contents, when he is working by himself. FIG. 2 shows what Adam, Brian, and Craig see when using the present invention when Adam shows his personal table of contents when he is in a meeting with Brian and Craig.

The simplest summary of the underlying logic is in FIG. 7. Brian and Craig are working for different companies than Adam. Adam hasn't authorized access to all documents of all of his projects for everyone. Brian and Craig are authorized to see only some documents of some of Adam's project. Through use of access dependent contents, their (limited) access rights are having effect on what they see when accessing Adam's personal table of contents. FIG. 3 shows (abbreviated entries for) the table of contents as Adam sees it himself, when he is working by himself FIG. 4 shows the table of contents as Brian sees it, when he is accessing it by himself (e.g. from his computer, logging in as himself). FIG. 5 shows the table of contents as Craig sees it, when he is accessing it by himself (e.g. from his computer, logging in as himself). FIG. 6 shows the table of contents as Adam, Brian, and Craig see it together as audience when using the present invention (in the meeting room).

FIG. 7 shows horizontal lines connecting items which, according to the theory and practice of the present invention, with "true" pass ("survive") logical AND operations combining Adam's FIG. 3 AND Brian's FIG. 4 AND Craig's FIG. 5 in order to appear in the resulting audience's FIG. 6.

In contrast, FIG. 7 shows NO lines for items which are NOT present in at least one of Adam's FIG. 3, Brian's FIG. 4, or Craig's FIG. 5, and which hence, according to the theory and practice of the present invention, DON'T appear in the resulting audience's FIG. 6.

Beyond correctly determining who is allowed to see what, a well-implemented system also should enable the operator to control the system, and the operator and the audience to actually see documents.

Figure 14:
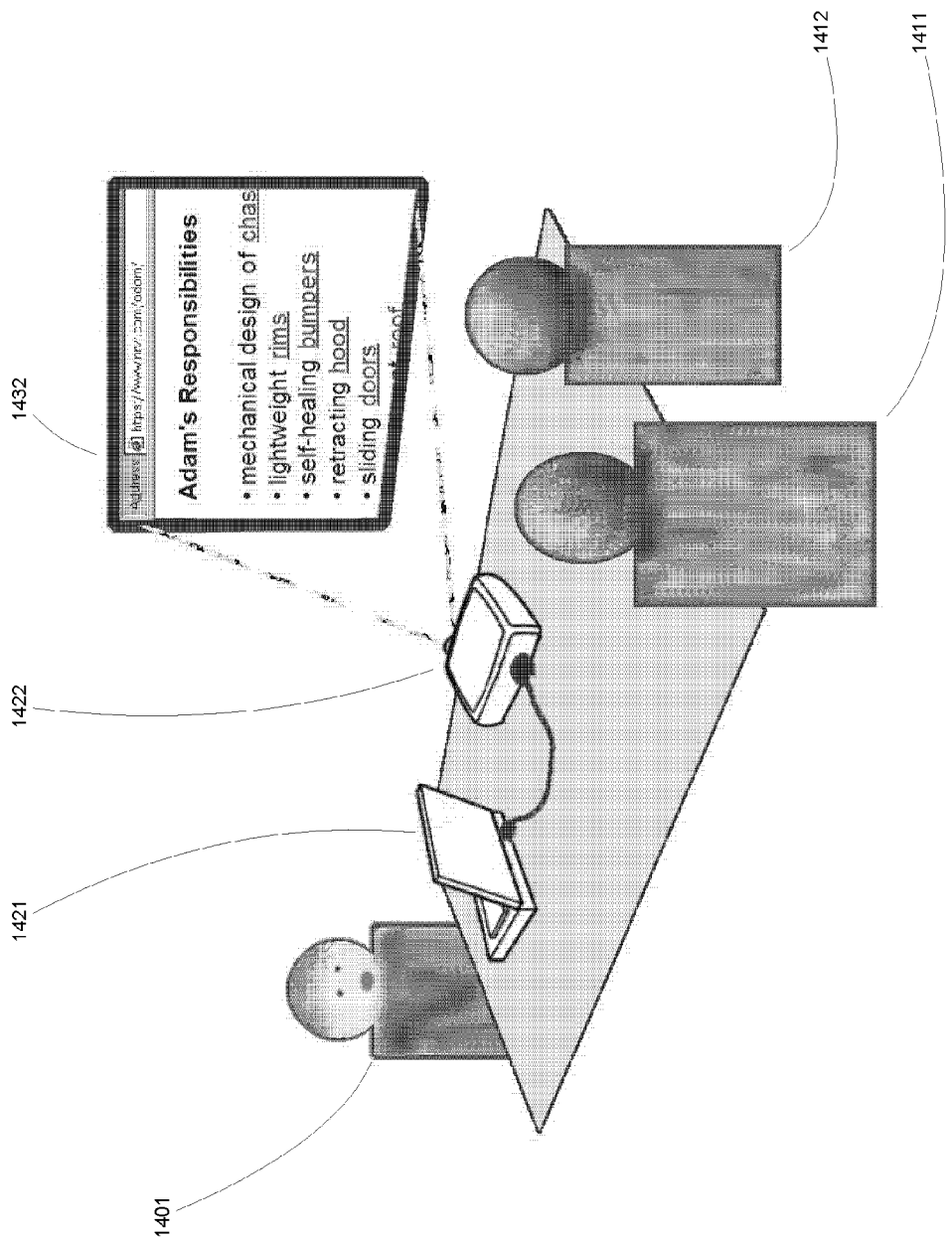
FIG. 14 illustrates a "document poker" use scenario where the more public display area is for everyone to see while the more private display area is for the operator only to see.

FIG. 14 shows Adam 1401 at his contemporary high-end notebook computer 1421, which has been configured to drive an outside display hardware unit 1422 with a separate image 1432, i.e. NOT just a mirror image. This means there is one display hardware unit (a notebook screen) 1421 more privately for Adam 1401 only to see, and another display hardware unit (a projector) 1422 for Adam 1401, Brian 1411, and Craig 1412 (together as audience) to see (on the projection screen) 1432.

For ease of comprehension of this disclosure, FIGS. 15 to 30 (instead of a notebook with a projector) show a notebook with an external LCD monitor connected, with the first display hardware unit 1521, 1621 being in landscape orientation, while in contrast the second display hardware unit 1522, 1622 has been chosen to be in portrait orientation.

Figure 15:
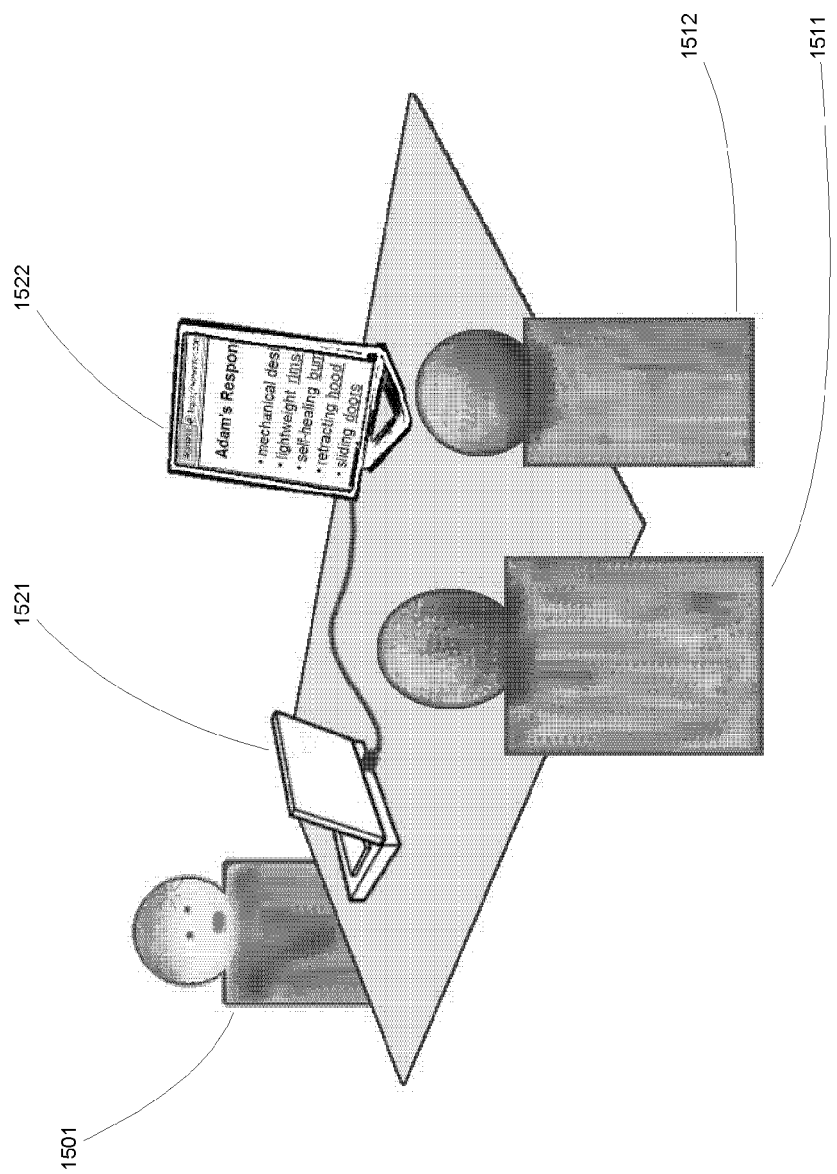
FIG. 15 is like FIG. 14, but with different hardware.

FIG. 15 shows Adam 1501 at his contemporary high-end notebook computer 1521, which has been configured to drive an outside display hardware unit 1522 with a separate image, i.e. NOT just a mirror image. This means there is one display hardware unit (a notebook screen) 1521 more privately for Adam 1501 only to see, and another display hardware unit (an external LCD monitor) 1522 for Adam 1501, Brian 1511, and Craig 1512 (together as audience) to see.

Figure 16:
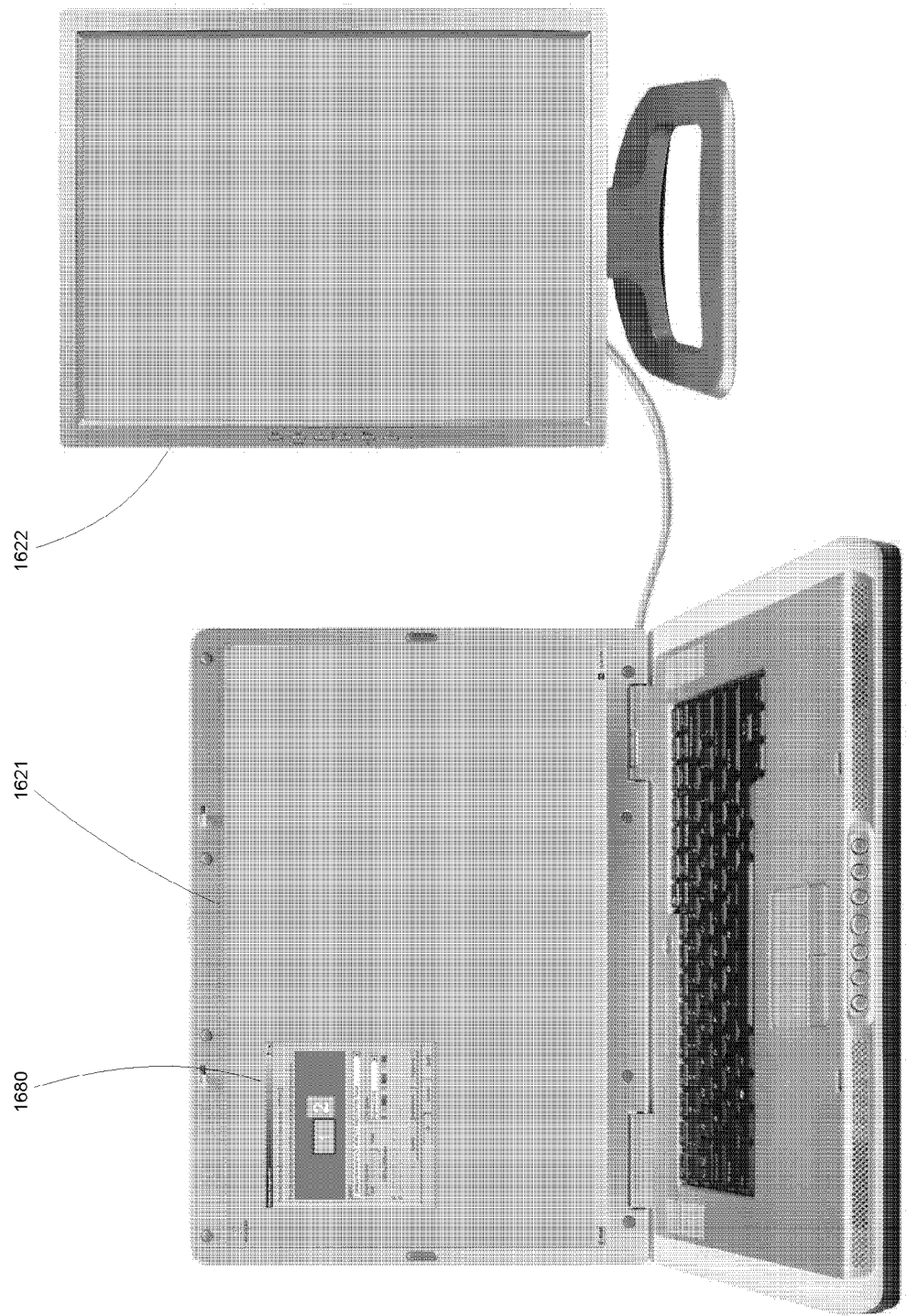
FIG. 16 shows a computer with two display hardware units.

FIG. 16 shows a prior art display hardware unit properties control panel 1680 has been opened.

Figure 17:
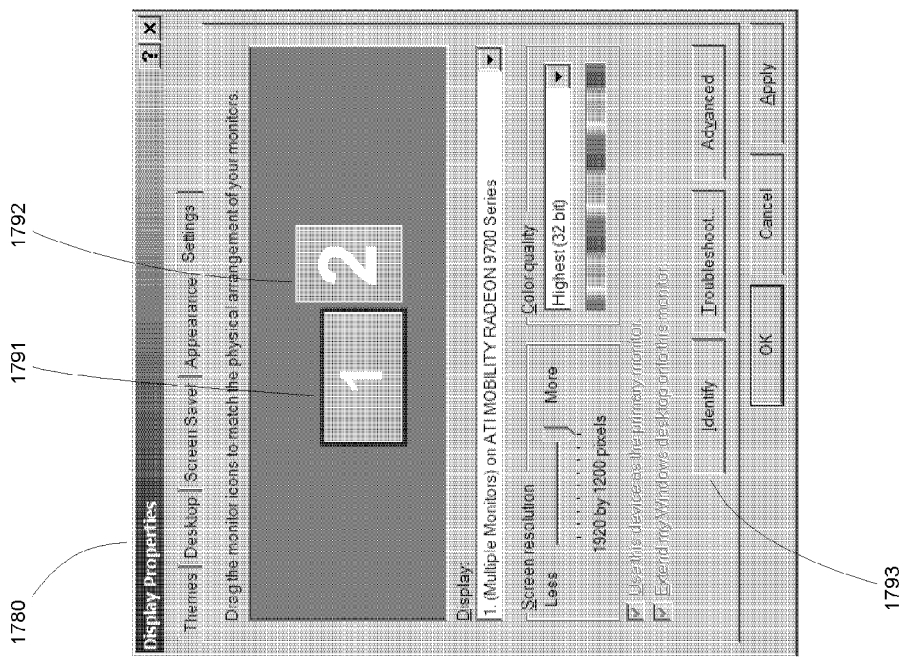
FIG. 17 shows prior art display hardware unit properties control panel software.

FIG. 17 shows within the prior art display hardware unit properties control panel 1780 there are visual representations of the first display unit 1791 and the second display unit 1792. If it weren't obvious from other circumstances, the operator could use the Identify button 1793, which causes large numerals to be shown on the actual display hardware units.

Figure 18:
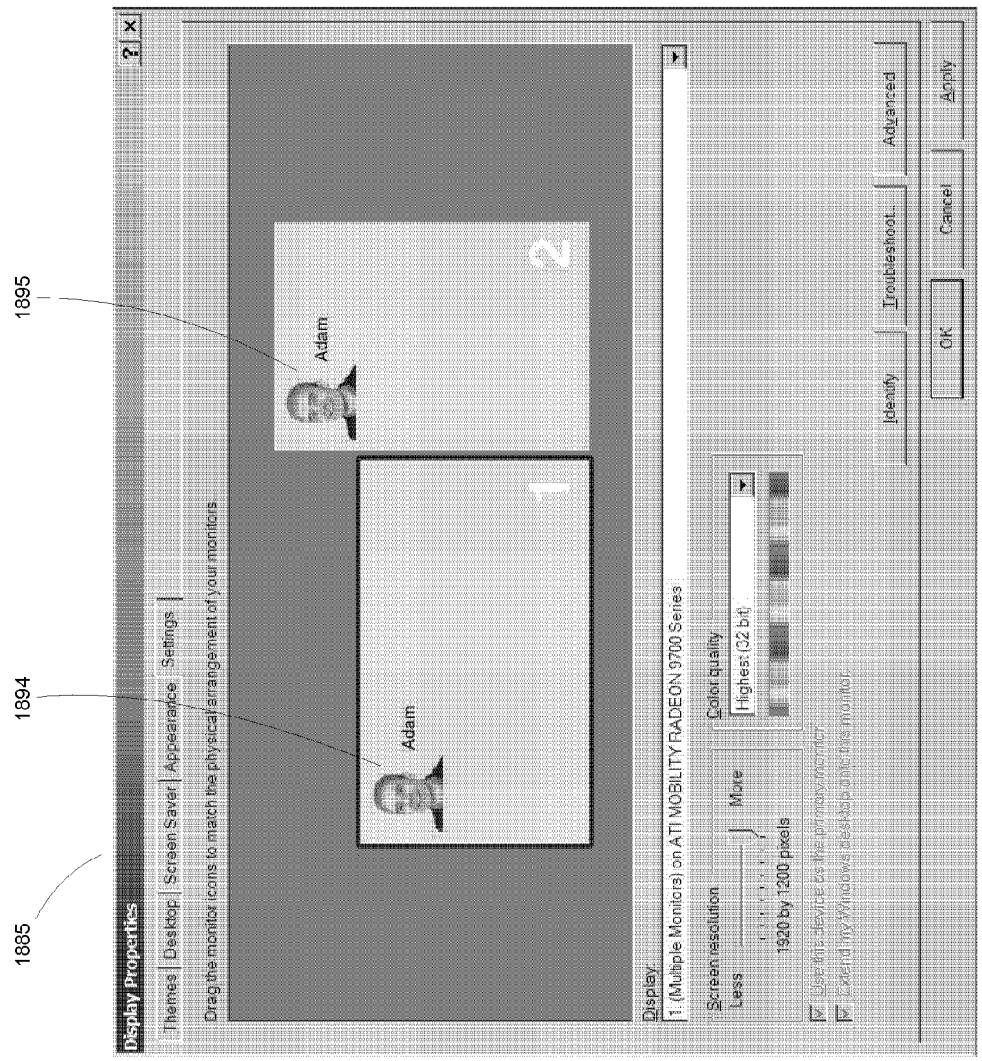
FIG. 18 shows display hardware unit properties control panel software which has been enhanced for access control.

FIG. 18 shows a display hardware unit properties control panel 1885 which has been enhanced for access control. With Adam being the operator, there is visual representation of Adam being registered 1894 to view the first display unit, and being registered 1895 to view the second display unit.

Figure 19:
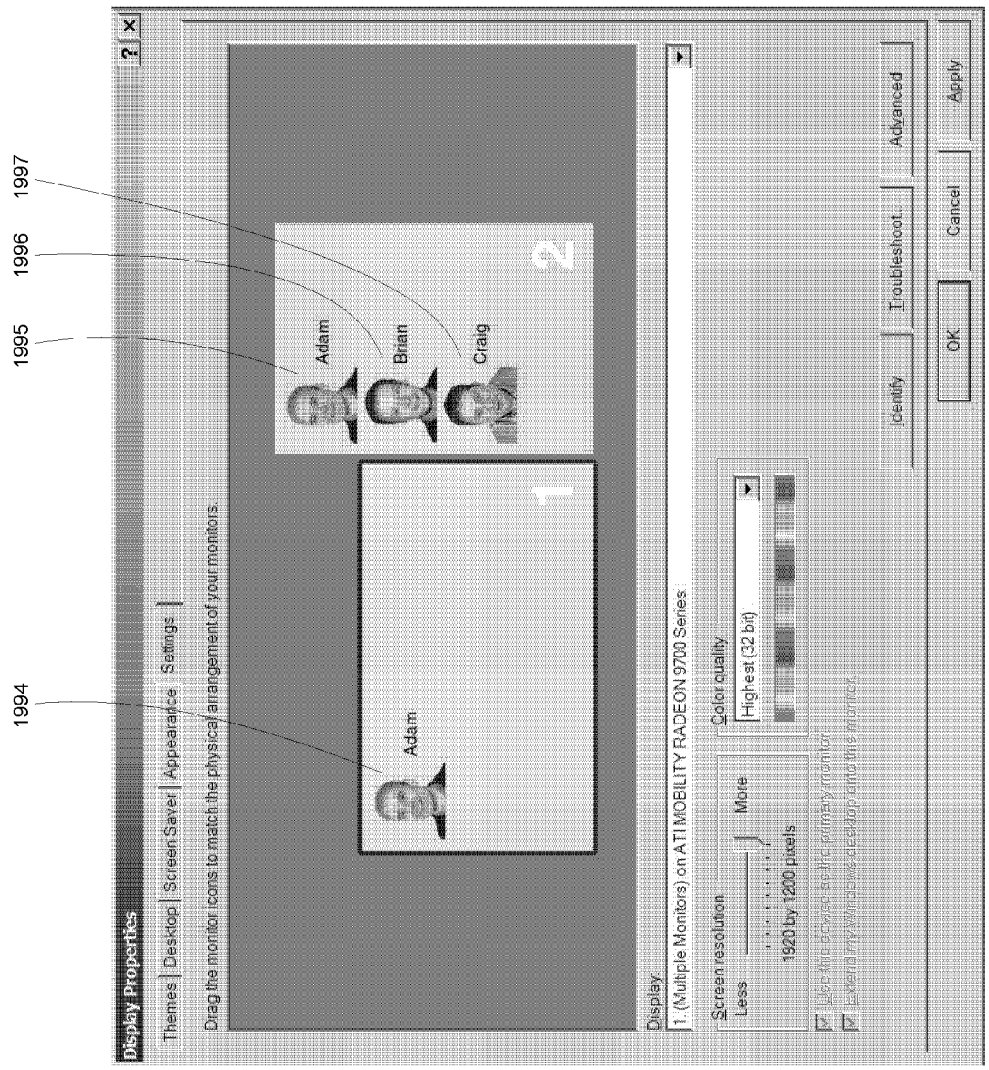
FIG. 19 shows display hardware unit properties control panel software with an audience.

FIG. 19 shows a display hardware unit properties control panel with an audience. With Adam 1994 (and 1995) still being the operator, there is visual representation of in addition Brian being registered 1996 to view the second display unit, and Craig being registered 1997 to view the second display unit.

Figure 20:
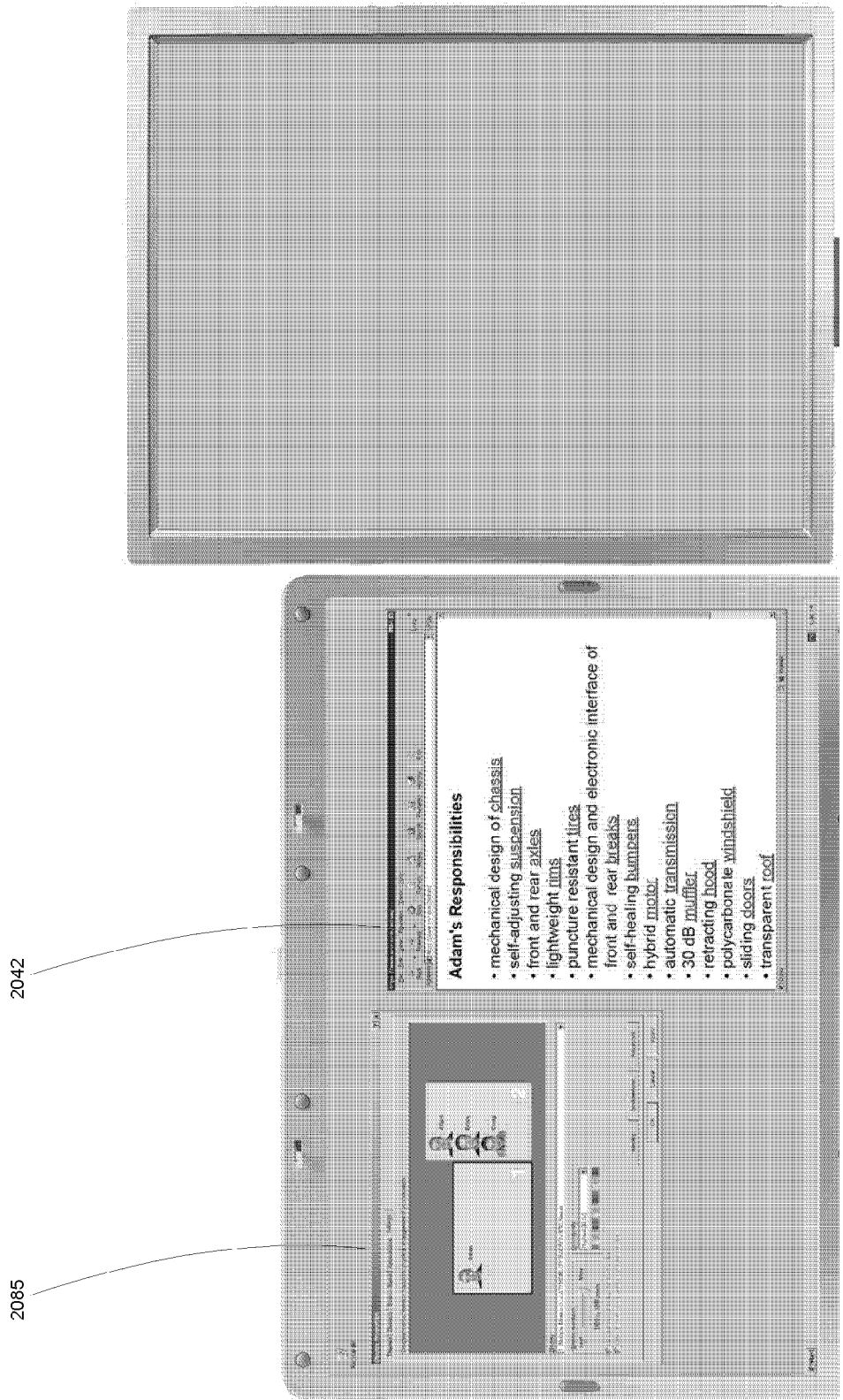
FIG. 20 shows a document on the first display unit.

FIG. 20 shows a document on the first display unit. The display hardware unit properties control panel 2085 still is visible in the background. A document is visible in a document viewing window 2042 on the first display unit. The document has been rendered for the person registered to view the first display unit.

Figure 21:
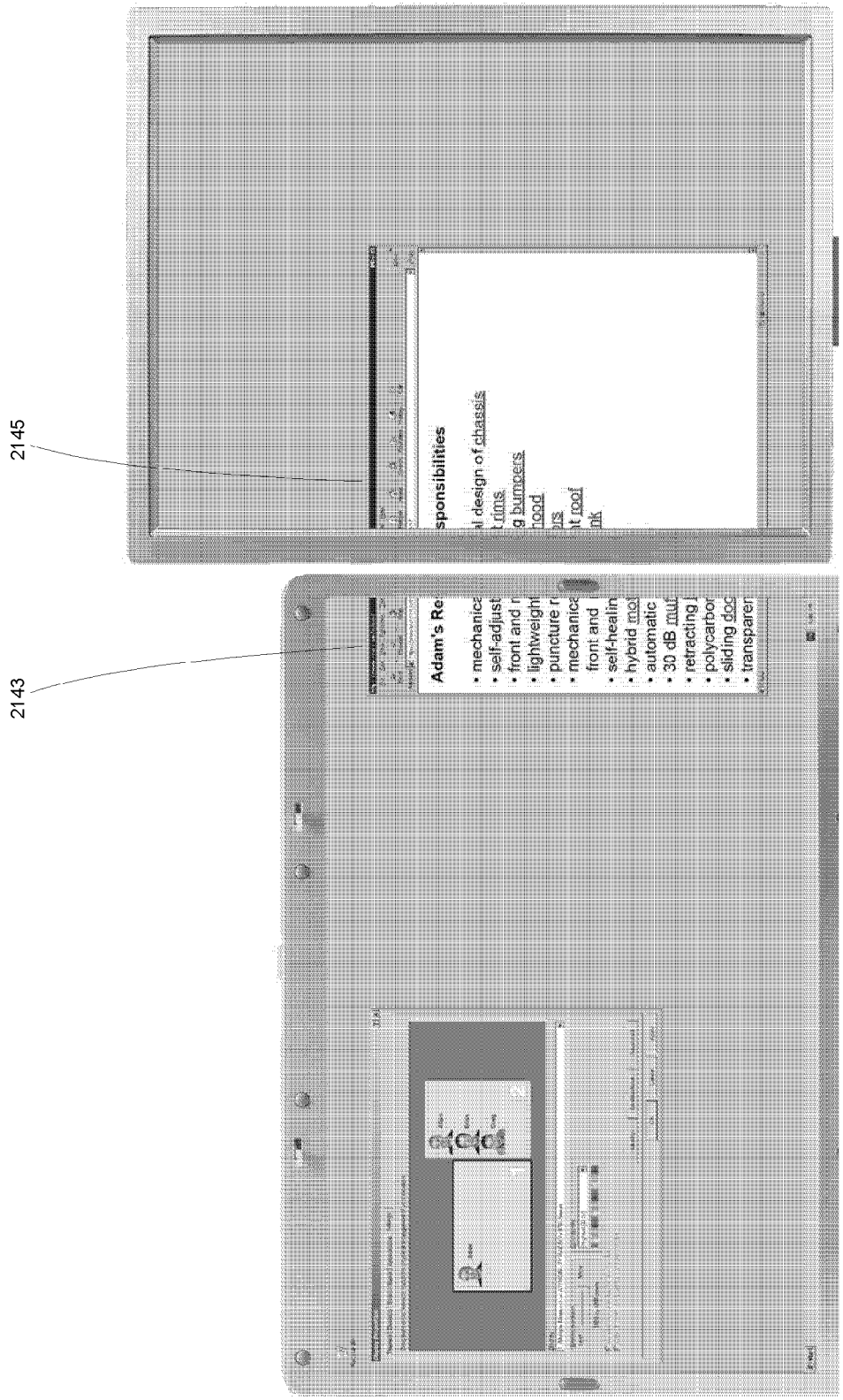
FIG. 21 shows the document being dragged from the first to the second display unit.

FIG. 21 shows the document being dragged from the first to the second display unit. As shown, the portion 2143 of the document viewing window which still is on the first display unit still is showing the document rendered for the person registered to view the first display unit, while the portion 2145 of the document viewing window which already is on the second display unit already is showing the document rendered for the people in the audience registered to view the second display unit.

Figure 22:
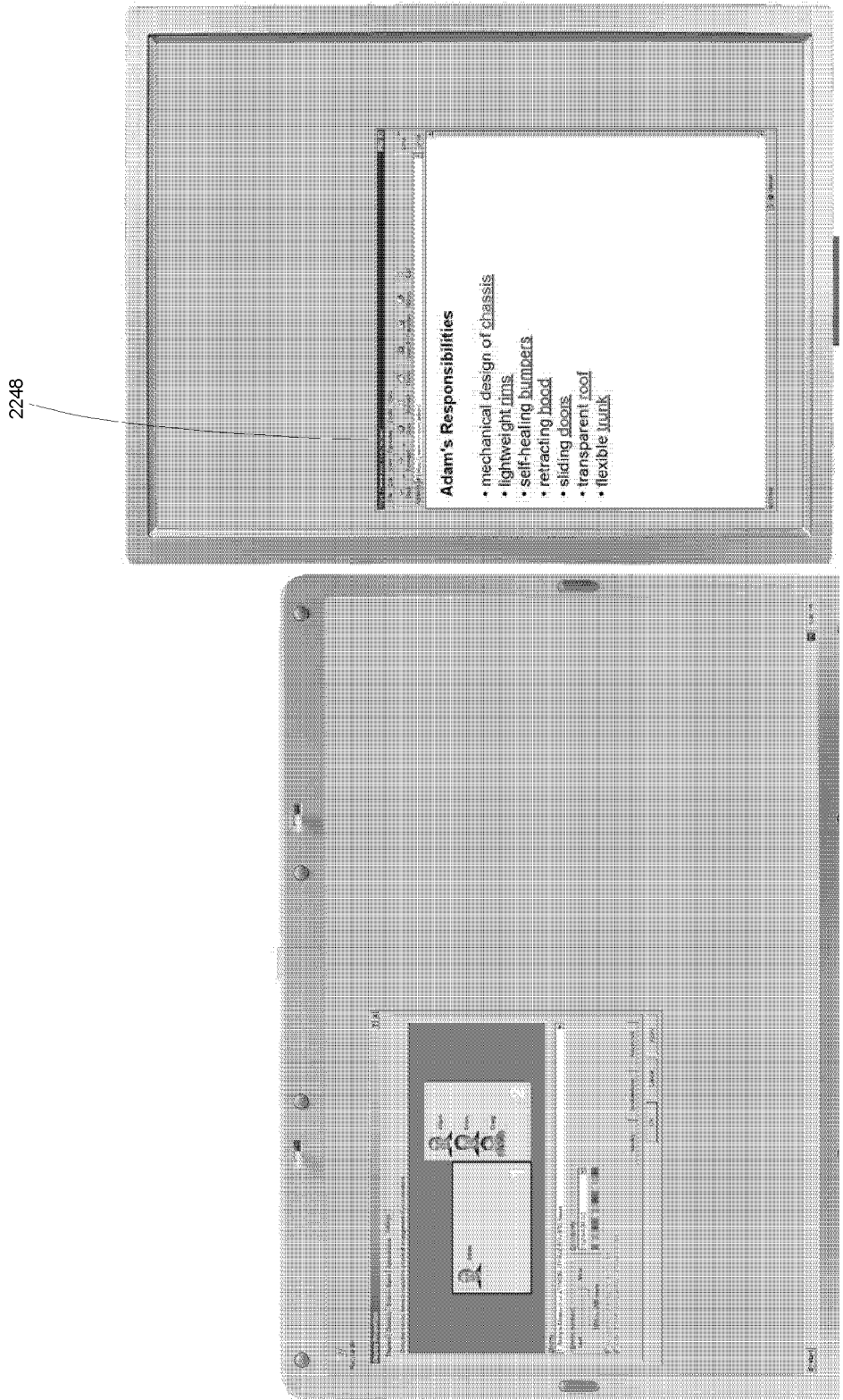
FIG. 22 shows the document on the second display unit for an audience.

FIG. 22 shows the document on the second display unit for an audience. The document viewing window 2248 is on the second display unit. The document has been rendered for the people in the audience registered to view the second display unit.

Figure 23:
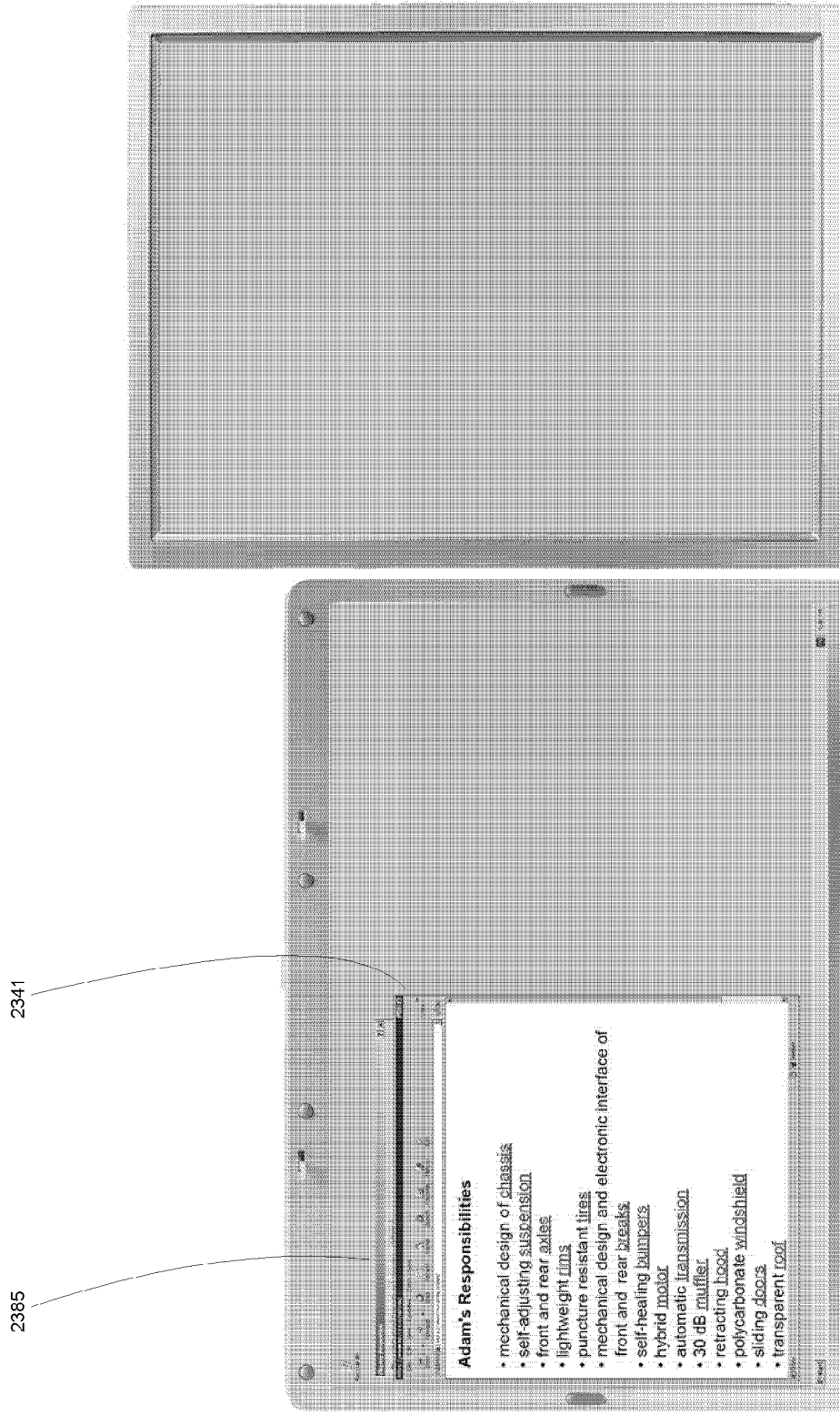
FIG. 23 shows a document on the first display unit.

FIG. 23 shows a document on the first display unit. A document is visible in a document viewing window 2341 on the first display unit. The document has been rendered for the person registered to view the first display unit. As could be mentioned, the display hardware unit properties control panel 2385 barely is visible in the background.

Figure 24:
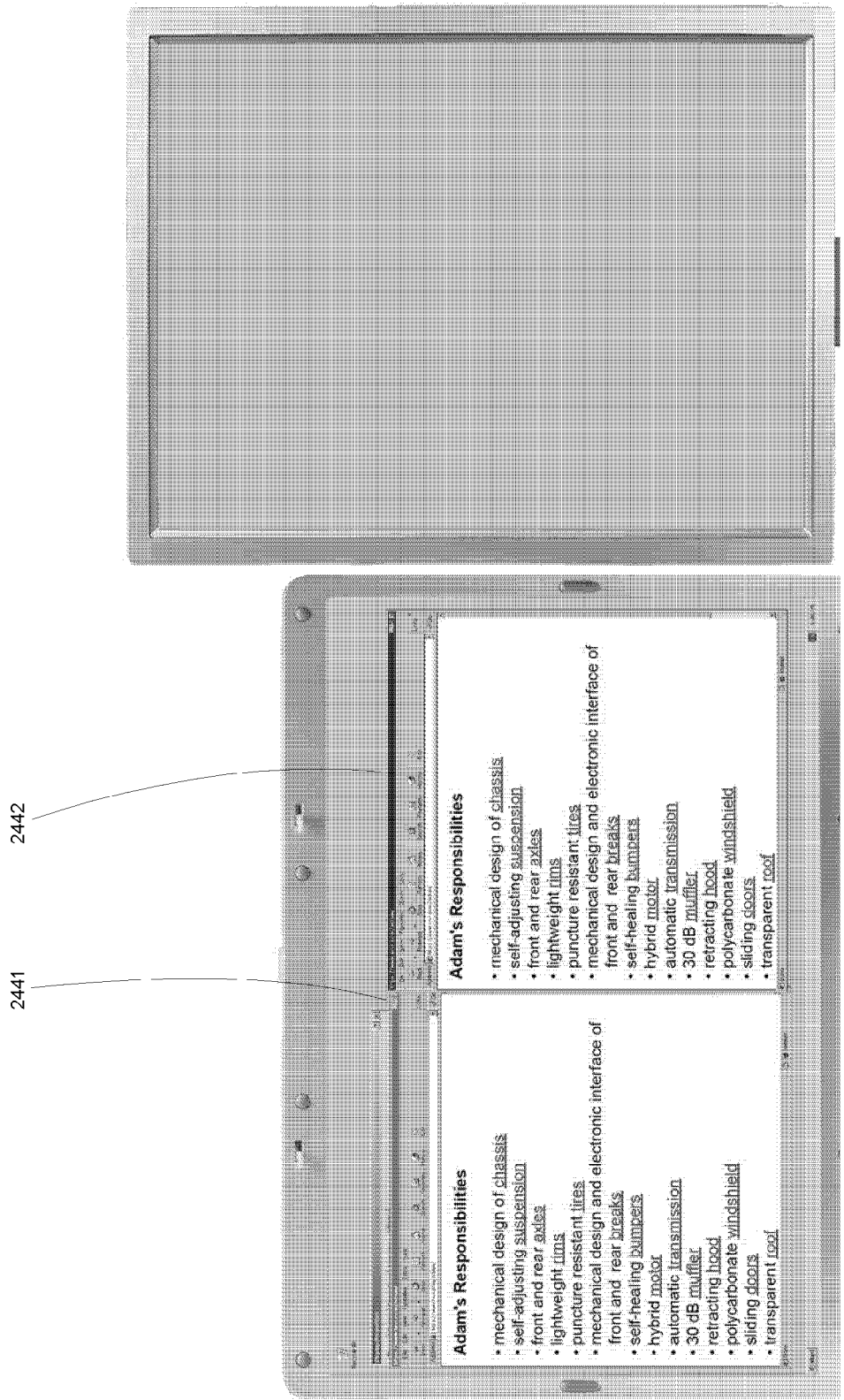
FIG. 24 shows two identical views of the document on the first display unit.

FIG. 24 shows two identical views of the document on the first display unit. The second document viewing window 2442 also is on the first display unit. The document also has been rendered for the person registered to view the first display unit. The first document viewing window 2441 (also 2541 in FIG. 25) still clearly is visible, although it is further back.

Figure 25:
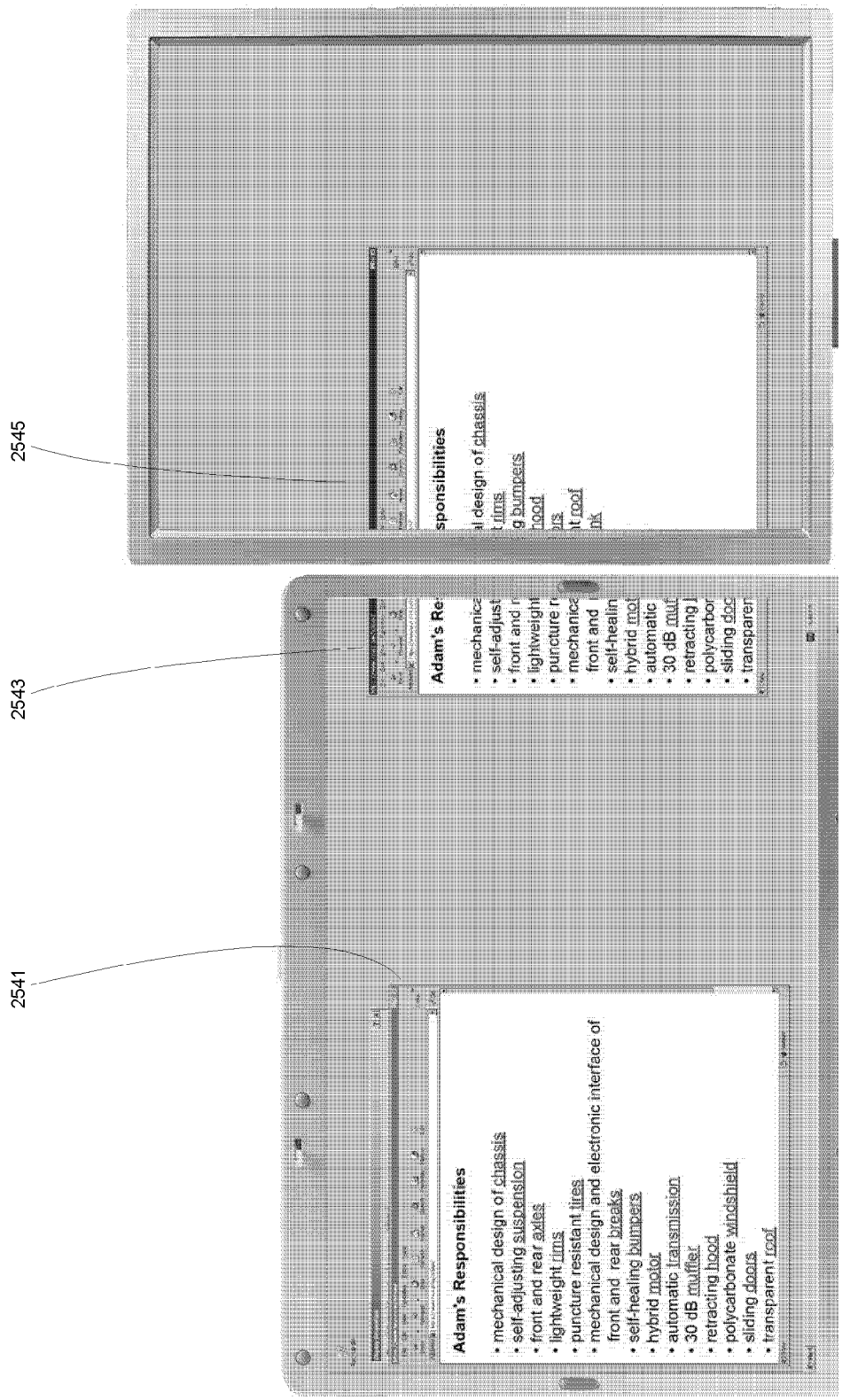
FIG. 25 shows the second window being dragged from the first to the second display unit.

FIG. 25 shows the second window being dragged from the first to the second display unit. As shown, the portion 2543 (also 2743 in FIG. 27, 2873 in FIG. 28, 2973 in FIGS. 29, and 3073 in FIG. 30) of the second document viewing window which still is on the first display unit still is showing the document rendered for the person registered to view the first display unit, while the portion 2545 of the second document viewing window which already is on the second display unit already is showing the document rendered for the people in the audience registered to view the second display unit.

Figure 26:
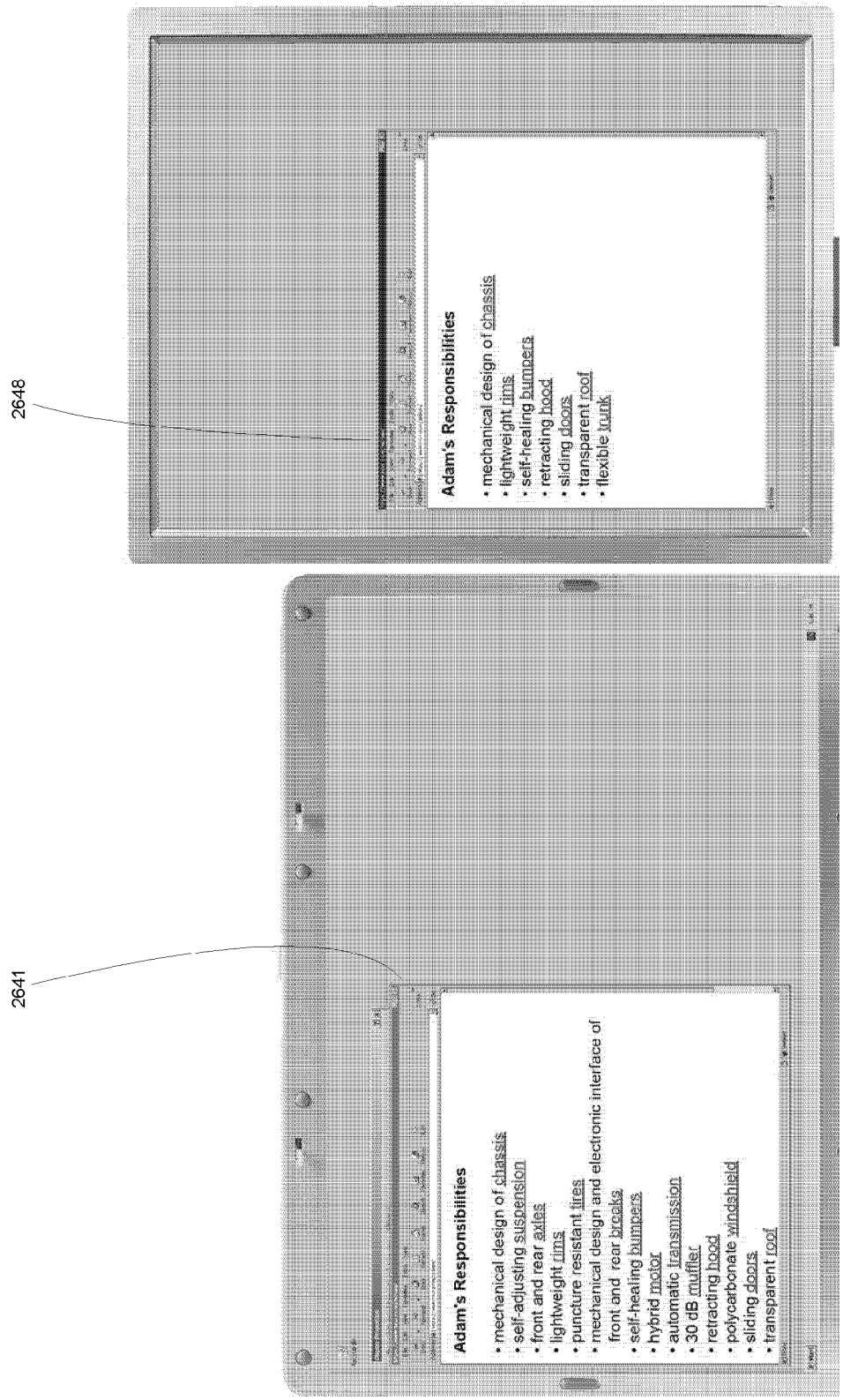
FIG. 26 shows the second window on the second display unit for an audience.

FIG. 26 shows the second window on the second display unit for an audience. The second document viewing window 2648 is on the second display unit; in it the document has been rendered for the people in the audience registered to view the second display unit. The first document viewing window 2641 still clearly is visible on the first display unit; in it the document has been rendered for the person registered to view the first display unit.

FIGS. 27 to 30 show alternatives to FIG. 21. FIG. 21 shows only one from a realm of possible implementations for dragging from the first to the second display unit; and FIG. 25 shows pretty much the same visual appearance of dragging as FIG. 21.

Figure 27:
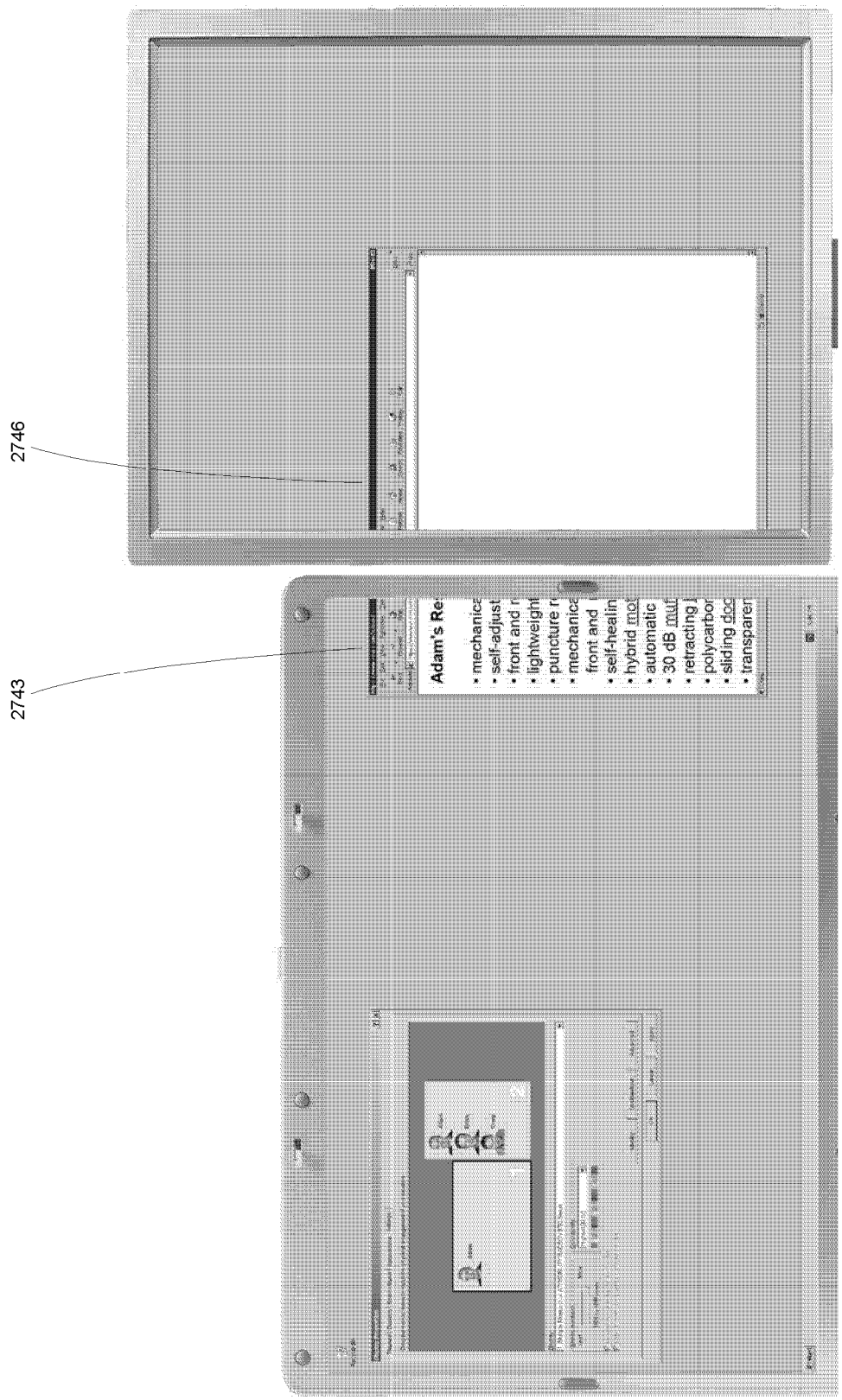
FIG. 27 is like FIG. 21, but the portion of the window on the second display unit is void of contents.

FIG. 27 is like FIG. 21, but the portion 2746 of the window on the second display unit is void of contents. It so happens that less implementation details also produce less information on the screen that could confuse an operator or other users. FIG. 22 is all the same a reasonable step to follow FIG. 27, although not to only possible step. Relative to FIG. 21, FIG. 27 or 28 could be cheaper to implement.

Figure 28:
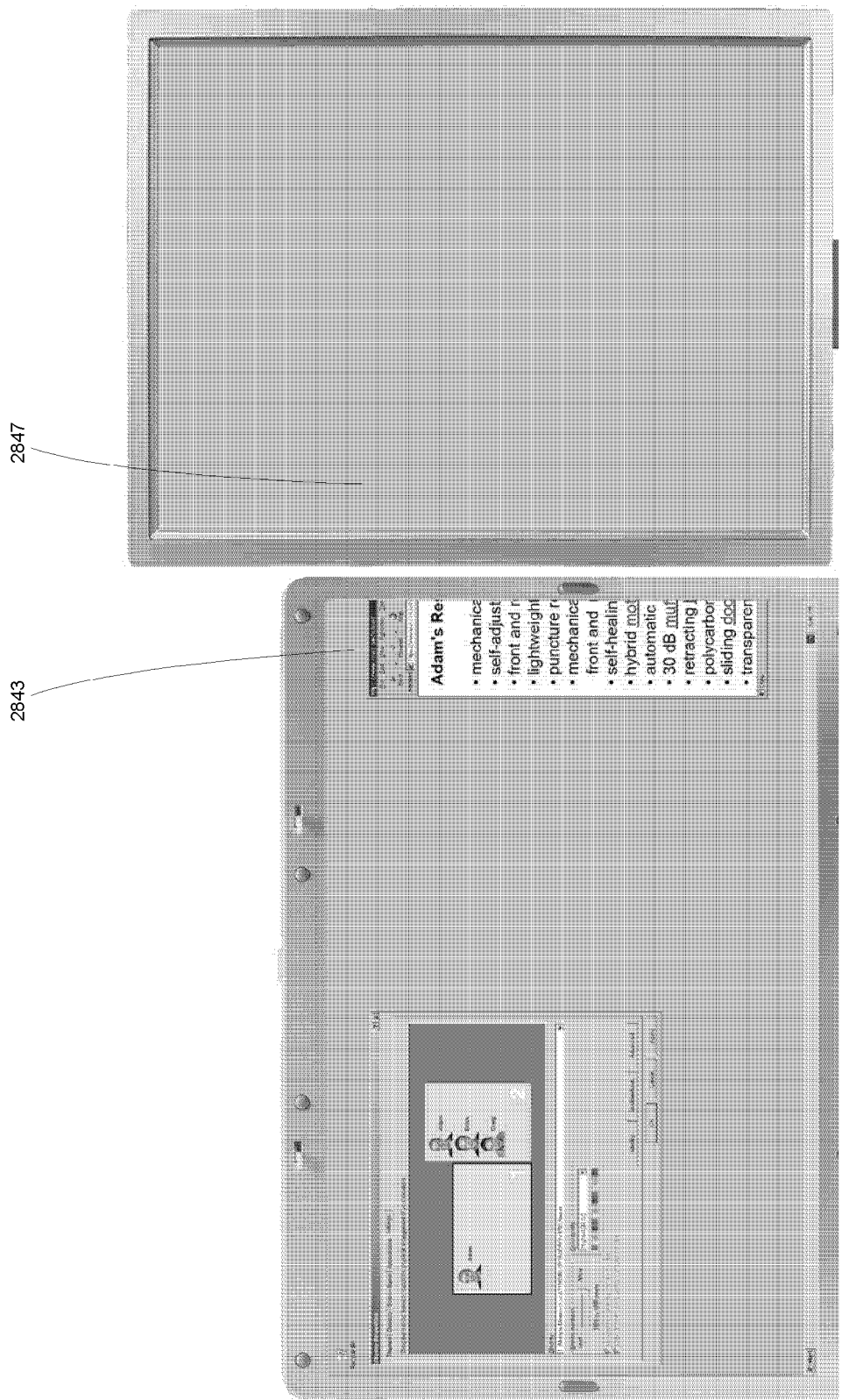
FIG. 28 is like FIG. 21, but no portion of the window is drawn on the second display unit.

FIG. 28 is like FIG. 21, but no portion 2847 of the window is drawn on the second display unit. FIG. 22 is only one of several possible reasonable steps that could follow FIG. 28; alternatively, e.g. an implementation could (after performing access control computations) display a message (e.g. in a modal dialog, or in a popup hint) on the first display unit which expresses that people in the audience registered to view the second display unit aren't authorized to view the document from the first display unit. (The astute reader may notice that there seems to be a number of slightly as well as some significantly different situations and possibilities to deal with. How to simplify dealing with that seemingly complex realm should be discussed in this disclosure in section "Handling Complex Decision Trees".)

Figure 29:
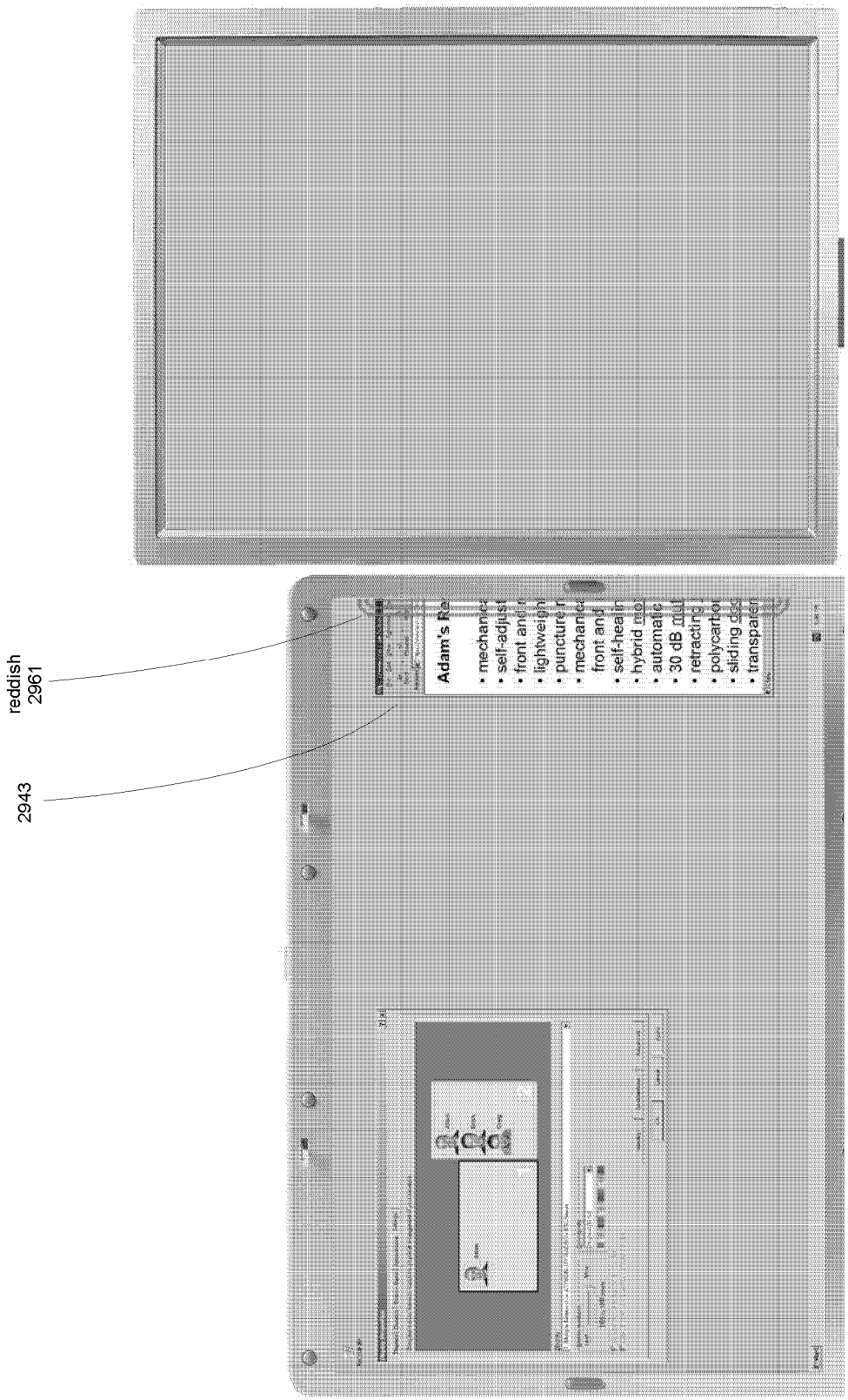
FIG. 29 is like FIG. 28, but there is an animated reddish alert pattern along the border of the first display unit where the window is being dragged from the first to the second display unit.

FIG. 29 is like FIG. 28, but it adds a striking visual alert for the operator. A reddish pattern 2961 (also 3061 in FIG. 30) along the border of the first display unit where the window is being dragged from the first to the second display unit should be animated in a good balance both of implementation efficiency and of user interface appeal. One good choice appears to be a limited size wave pattern emanating from the intersection between the window and the border of the first display unit; in which there should be motion in the pattern only at the same time when there also is an actual dragging motion for the window, which in contemporary user interface object platforms might be implemented most easily by tying pattern drawing to mouse cursor events, or to window drawing, rather than animating in an extra thread.

Figure 30:
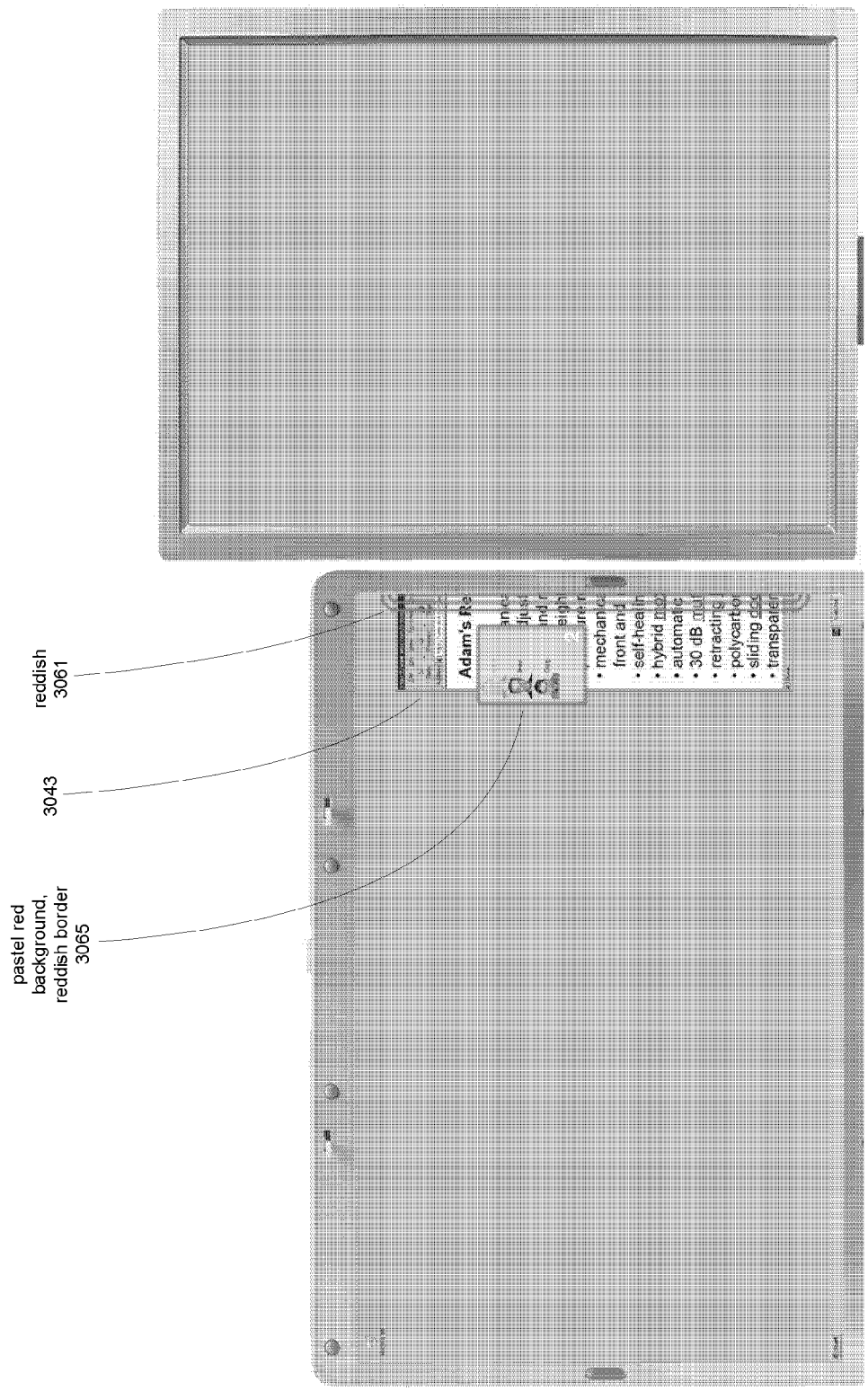
FIG. 30 is like FIG. 29, but a pastel red popup hint on the first display unit displays information about which of the users registered to view the second display unit aren't authorized to view the document as it is rendered on the first display unit.

FIG. 30 is like FIG. 29, but it adds a pastel red popup hint 3065 on the first display unit, which displays information about which of the users registered to view the second display unit aren't authorized to view the document as it is rendered on the first display unit. Such information in a clean architecture should be obtainable as an additional output of the same or of similar computations as for document rendering in FIG. 21. Less importantly, the display hardware unit properties control panel has been closed, and hence no longer is visible in the background, which should help illustrate that it has been optional in other Figures.

Figure 31:
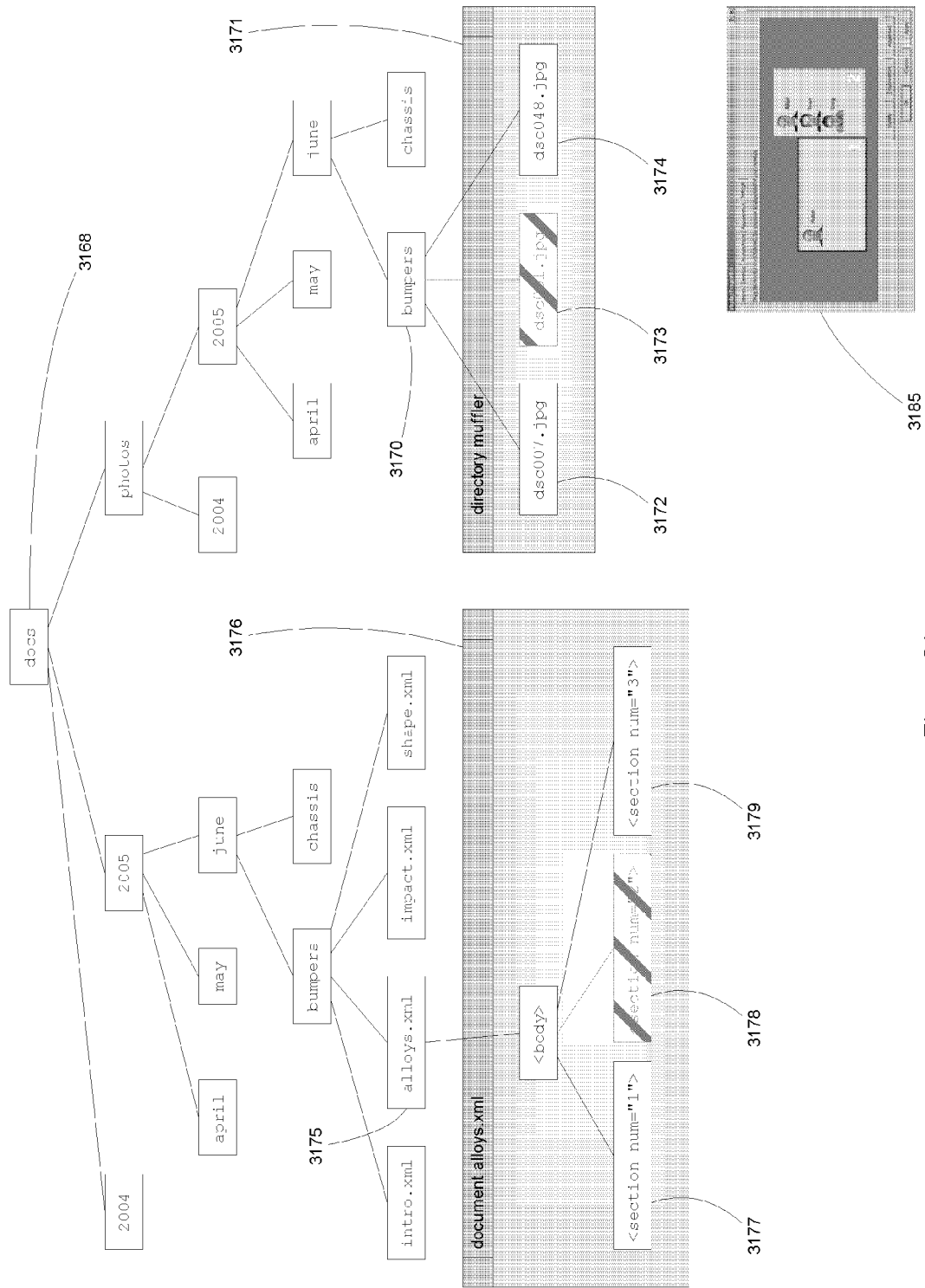
FIG. 31 helps illustrate the concept of private previews of parts of a body of digital documents under access control, including a preview of a listing of files in a directory as well as a preview of access dependent contents.

FIG. 31 (for illustration purposes using a mix of modes of representation) helps illustrate the concept of private previews 3171 and 3176 of parts of a body of digital documents under access control, including a preview 3171 of a listing of files in a directory 3170 as well as a preview 3176 of access dependent contents of a structured document 3175.

The root of the body of digital documents is directory docs 3168. The same as in FIG. 19, hardware unit properties control panel 3185 shows one person (Adam) registered to view the first display unit and three people (Adam, Brian, and Craig, an audience) registered to view the second display unit.

Somewhat abstracted for the purpose of illustration, in preview window 3171 is Adam's listing of files in (photos) directory bumpers 3170 as Adam is authorized to see it with files dsc007.jpg 3172, dsc031.jpg 3173, and dsc048.jpg 3174, yet it is enhanced with visual modification (dimming and a fill pattern) of file dsc031.jpg 3173, because an audience comprising Adam, Brian, and Craig is not authorized to access that one file. This kind of preview allows Adam to compare what he knows (is allowed to know) with what the audience can see (is allowed to know). Clearly, this kind of preview is only to be shown on the first display unit, privately to Adam.

Abstracted for the purpose of illustration, in preview window 3176 is Adam's view of structured document alloys.xml 3175, which contains access dependent contents, as Adam is authorized to see it with three sections 3177, 3178, and 3179, yet it is enhanced with visual modification (dimming and a fill pattern) of the second section 3178, because an audience comprising Adam, Brian, and Craig is not authorized to access that one section. This kind of preview allows Adam to compare what he knows (is allowed to know) with what the audience can see (is allowed to know). Clearly, this kind of preview is only to be shown on the first display unit, privately to Adam.

If desired, less abstract examples of preview in the context of access control can be seen in aforementioned patent application Ser. No. 11/308,636, specifically in its FIGS. 17 to 21. In those figures a more pleasant rendering of contents is shown, although they do not describe exactly the same scenarios as this disclosure.

Feature Details

This disclosure so far has presented an informal narration, and has sketched its key concept. Following sections present features of the present invention one at a time, deal with implementation, etc.

TERMS AND EXPLANATIONS

For the purpose of clarity of this disclosure, the term "operator" has been used to identify the person who directly interacts with the "user interface", which hence would better be called "operator interface", were it not for the fact that "user interface" is an established term. Because the present invention concerns itself with access control, one "user" or several "users" may be depicted in the user interface, as well as "groups" of users and "roles". Users, groups or roles are given access privileges for resources by the operator. The operator himself may also appear in the user interface, as one of a number of users.

An operator of the present invention often is expected to be a professional in a field that isn't computer science, possibly not technical at all.

Names and document contents used in examples herein are intended to be fictional.

The term "document poker" for a use scenario has been named after the card game.

The term "likeness of a person" means an identifying pictorial representation of the person, an imitative image, e.g. an identifying photograph, possibly a modified photograph or a machine processed image of that person that sufficiently corresponds to the person's appearance to allow a normally skilled human to identify the person in an encounter with normal visual contact. Examples of "likeness of a person" are at least in visual representations 1894 and 1895 in FIGS. 18 and 1994 to 1997 in FIG. 19.

In the context of this disclosure, the term "access control" has a certain breadth, but is not meant to include some concepts that commonly would be rejected as "this is not access control". In the context of this disclosure, "access control" must use "persistent yet revocable access control settings". "Persistent yet revocable access control settings" are access control settings that are persistent by default yet allow revocation if needed. Being "persistent yet revocable" is considered normal for access control settings.

"Revocable access control settings" are access control settings that at a future point in time can be changed so that e.g. a person who has had access then will no longer have access, or e.g. a person who has had write access then only will have read access. Being "revocable" is considered normal for access control settings. The ability for a user to be "removed from access to" a resource is intrinsic to the present invention, evidenced at least by the mention of removal in aforementioned patent application Ser. No. 10/802,658. "Revocable" is in contrast to non-revocable access, e.g. in contrast to commonly used email, which once a message has been sent no longer allows for a recipient to be removed. "Revocable" is essential to allow correction of operator errors. "Revocable" is required when changes in circumstances lead to changes in "need to know". "Revocable" can help reduce information overload. "Revocable" enables reducing access after a document (e.g. medical record, legal record) or its surrounding real world matter (e.g. medical case, lawsuit) has been dealt with (e.g. patient discharged, case closed).

"Persistent access control settings" are access control settings that are stored persistently, often to disk, in such a way that users and other parties expect them to last for lengths of time that for most practical purposes appear to be without end. Being "persistent" is considered normal for access control settings. "Persistent storage" of access control settings is intrinsic to the present invention, evidenced at least by repeated mention of persistent storage 155 in aforementioned patent application Ser. No. 10/802,658.

"Persistent" is in contrast to non-persistent settings, e.g. in contrast to settings that last only for the duration of an instant messaging conversation, an online meeting or an online chat. "Persistent" is required for collaboration among those in different working periods (day shift versus night shift), for collaboration across distant time zones, for collaboration without "same time presence", for long running workflows and for all situations where the expectation is for "records to remain constant for a long time".

In some embodiments, notwithstanding above definition, "persistent access control settings" may come to an end purposefully in a controlled manner at contextually meaningful, defined points in time, e.g. after 30 days or when a patient has been discharged. Access control settings that come to an end in a controlled manner at defined points in time may or may not be known in prior art and are mentioned here solely for the purpose of more clearly defining what still should be considered "persistent access control settings", by its nature as well as by its probable implementation using persistent storage. "Persistent" is in contrast to non-persistent settings, e.g. in contrast to settings that are lost when a controlling application or computer in a normal course of events or typical use shuts down, suspends or restarts, or that lose effectiveness when an online meeting or session ends or expires. "Persistent" fulfills more significant needs and has more essential impact on the productivity of professionals than non-persistent. Professionals often need access control settings that remain constant and behave predictably, i.e. without undue susceptibility to surrounding events.

The present invention can be applied to many kinds of "digital documents". Listing some applications to specific kinds of digital documents helps bring home the fact that prior art has left professionals without the tools they need.

Representative examples of a "digital document" are a word processing document, a digital photograph, a digital illustration, a digital engineering drawing, a digital medical document, a digital legal document, and a Web page.

Many contemporary office workers are familiar with a number of common uses of the word "document": The first command in the Standard toolbar of Microsoft Word 2002 is "New Blank Document". Then, Microsoft Word 2002 names new documents "Document1", "Document2", and so on. Microsoft Windows XP presents a folder to hold documents which is called "My Documents", which is distinct from the folder "Program Files". For a file "example.doc" Microsoft Windows XP Windows Explorer shows Type "Microsoft Word Document", which is distinct from the same version Windows Explorer for file "WINWORD.EXE" showing Type "Application". Adobe Systems Incorporated has defined the Portable Document Format (PDF) standard. A file in Portable Document Format is distinct from Adobe Acrobat, which is application software. Windows Explorer for a file "example.pdf" shows Type "Adobe Acrobat Document", which is distinct from for file "Acrobat.exe" showing Type "Application".

In the context of this disclosure, the term "digital document" is definitely not identical to the term "file" from the broadly stated "everything is a file" in Unix architecture literature. In the context of this disclosure, the term "digital document" specifically does not include file system directories, does not include devices, sockets, and pipes, and does not include system files, system software, and application software.

Despite distinguishing software from documents, ancillary scripting in a document that essentially carries data does not automatically disqualify the document from being a "digital document". E.g. embedded JavaScript that on load checks a table of contents against section headings doesn't cause a containing document which is rich in content to "be software".

A "Portable Document Format document" is a document in the format "Portable Document Format" (PDF) created by Adobe Systems Incorporated.

The word "display" is being used in a number of different ways within this disclosure, each one valid within its context. While most instances should be comprehensible to someone experienced in the art, maybe in one case or another the following list, which at least at one point has been an exact list of all uses in this disclosure, might be helpful to someone: "Display" (transitive verb) means to show representation of something. "Display" (noun) means a hardware display device. "Display" (noun) means a visual representation of something (on a hardware display device). "Display area" (noun) means part of a display. "Display area" (noun) means a region on one or more display devices. "Display hardware unit" (noun) means a single hardware display device. "Display unit" (noun) is shorter for "display hardware unit", without emphasis on hardware. "Display unit" (noun) is informal for the display on a display hardware unit. "Be on display" means to be visible.

In discussing the present invention there has been use of the terms "an instance of access", "equivalent access", and variations of the term "determining access control". "An instance of access" is for someone a certain kind of access to something. If instead it were someone else but still for the same kind of access (e.g. to read) to the same thing (e.g. a file), then it would be "equivalent access" by that someone else. "Kind of access" also is known as "access method". "Something" e.g. could be a file, and in that example then if someone wants a view of thumbnails of three documents (each stored in a file by itself) in a directory that could be three "instances of access", i.e. one instance of access (which makes it necessary to "determine access control") per each file, whereby the determination made (whether to allow or to deny access) could be different for each of the three instances of access, even if that someone (a user) isn't really aware he has triggered three "instances of access" but only thinks he has done one thing by requesting a thumbnail listing of that directory. It needn't always take a user to actually request access to something for software on a computer to be triggered to "determine access control", to "determine whether to allow or to deny access" or to "determine which access methods to allow". Preview mode (when an operator wants to preview what an audience would see) is at least one good reason to "determine access control" (for access to something) at a time when the users (the audience) for whom access control (to that something) is being determined don't even request an access. In preview mode, results of "determination of access control" can be used to display what an audience would see.

General Observations

The present invention has been devised to work well but not only with systems built as described in aforementioned patent application Ser. No. 10/802,658.

At the time of this disclosure, the best mode contemplated by the inventor for carrying out the present invention is an implementation as document viewing (and possibly editing) client software with storage server software connected via Web services (information about Web services is at the World Wide Web Consortium website). It is expected, however, that once the usefulness of the present invention has become apparent to more people, the present invention will be considered for implementing with a number of system architectures. Because of the possibility of complexities of retrofitting into existing architectures, careful balance has been struck in this disclosure in order to provide a clear and concise yet still full and exact description of the present invention. In order to encourage widespread adaptation, neither a specific programming language nor a specific graphical user interface object library are required.

In order to implement the present invention, skills in both user interface engineering and access control engineering are required. In both fields there are practitioners of greatly varying levels of skill and experience. As an example, in user interface engineering there are those who solely have used user interface libraries and claim to have user interface engineering experience, and then there are those who have designed the libraries used by hundreds of thousands of others, e.g. Java Swing, or who have authored leading edge drawing software, e.g. Macromedia Freehand. As another example, in access control engineering there are many who have configured servers, while there are fewer who have designed actual executing code, e.g. mod_ssl, or who have authored leading edge security software, e.g. PGP. The quality of an implementation will more or less depend on the skill and experience of those who engineer it. Other skills that might be considered distinct and helpful include experience in network protocols, markup language, Web services, storage servers, workflow, algorithm development, and rules engines.

According to the theory and practice of the present invention, "looks do matter". In order to achieve highest rates of correct decisions by operators in the shortest possible time with least effort, what the operator sees is of critical importance. Beyond a certain point, quantitative differences in visual appearance become qualitative differences. By analogy: If the font size of text is below a certain size, e.g. below four, then no one can read at all; if the font size is above a certain number, e.g. above thirty, then most people can read even if they didn't bring their glasses and would need glasses for regular sized text, e.g. for size ten. A quantitative difference in font size effects a difference in whether people can read at all, i.e. a qualitative difference.

According to the theory and practice of the present invention, there are practical limits to the amount of abstract reasoning that should be demanded of an operator of a system. These limits may be different from person to person; the limits may be different for a one-time effort and for repeated performance. According to the theory and practice of the present invention one can achieve much higher rates of correct decisions by operators by relieving them of the need to perform complex symbolic mental operations.

Information Organization

Documents commonly are considered as having tree structure. One example is the DOM tree of an XML document. Documents themselves, as addressed by URI, can be leaves in a resource tree. Many principles of access control can be applied similarly to nodes in a resource tree as well as to nodes in a document tree.

Implementation Algorithm

A basic implementation of an algorithm to determine access rights for an audience according to the theory and practice of the present invention would be:

(1) For an audience object resolve its membership to a set of users.

(2) For a node in a tree of information, for which access is requested, for each element of the set of users determine whether access is allowed. Optionally, while making such determinations, a set of users who aren't authorized could be collected; and consequentially such set could be used e.g. as basis for an informative user interface display.

(3) When access is denied for at least one user, remaining (further) users would not have to be tested (unless required for collecting that optional set of users who aren't authorized).

(4) Allow access if and only if access has been determined to be allowed for every element of the set of users; aka logical AND.

For (plain old) access to a whole document, these steps should be performed once.

For access dependent contents, however, these steps should be performed as needed for nodes in the document's (DOM or other) tree of elements which have access dependency settings which require processing. Optionally, multiple of those sets of users who aren't authorized could be collected for informative displays.

After determination of access rights for an audience, display should be implemented essentially as if the same result of determination of access rights had been made for an individual user who is (has been) identified (logged in) to the computer system.

In a product quality implementation, as in many modern system architectures, careful balance would have to be chosen in how much to make use of accelerated algorithms in case performance measuring indicates it is worth pursuing.

Logic other than logical AND may or may not be nonsensical, but it could be defined mathematically and could be implemented algorithmically.

One potentially useful alternative to logical AND is if the determination to be made is not just whether to allow or to deny, but which (of several possible) access method to allow, then to make the determination in such a manner that the resulting method (without exception) would be allowed (for access to the same node in the tree of information) for each (individual) element of the set of users by itself (himself). As an example, if possible access methods are WRITE, READ, and NONE then a comparison could be defined where WRITE is greater than READ, and READ is greater than NONE, optionally numerically encoded with WRITE equals 2, READ equals 1, and NONE equals 0; of the methods allowed for each user in the audience the smallest would have to chosen, e.g. if at least one user in the audience is limited to NONE then NONE, else if at least one user in the audience is limited to READ then READ, else (i.e. if all users in the audience are allowed to WRITE then) WRITE.

Audience Object

A basic implementation of an "audience" object according to the theory and practice of the present invention would support: Adding users; removing users; returning the set of users.

As needed in an implementation additional features could include: Adding and removing groups; adding and removing roles; naming an audience; keeping and returning a reference to the context from which the audience has been defined, e.g. a meeting.

As a consequence of how macros have been defined, adding a macro should be implemented as a sequence of adding users (optionally groups, roles, or similar entities).

Whether to implement an audience object with a list, a set, or another kind of collection will depend on coding style. Java provides a variety of data structures and classes, which can be subclassed. In general, simple and straight forward should be preferred. At some point it may be influenced by performance measurements.

APIs

Audience objects become more useful when used as parameters to APIs (application programming interfaces).

In an implementation of access control with user interface which at least to some degree resembles what has been described in aforementioned patent application Ser. No. 10/802,658, specifically in its section "Interfacing With Apache Web Server Software" and in its FIG. 2, even if implemented as XML over HTTP (as a Web service), there will be at least some programmatic interface which for a request accepts as parameters (1) a reference to a user (e.g. a user id), (2) a resource identification (e.g. at least part of a URI), and (3) an access method and which returns whether or not such request is authorized. Such function might be called "requestAuthorizationCheck". Example invocation:

boolean auth=requestAuthorizationCheck(req.user, req.path, req.method);

To be sure, there should be a number of other functions which provide related functionality; some accepting references to users, some accepting references to groups, some returning collections, etc.

Audience objects are useful when instead of a reference to a user it is possible to pass a reference to an audience to function requestAuthorizationCheck.

To achieve that, a number of implementation patterns can be suggested; and which one to prefer might be a question for which there isn't an absolute answer (in the same category of questions as whether one should prefer infix, postfix (reverse Polish notation, RPN), or prefix notation for a calculator).

Any implementation should be easier if a user internally (inside access control implementation software code) isn't identified by a user id string, but instead is identified by a reference to a "user" object.

The following suggestions are being made while thinking in terms of Java, as defined in The Java Language Edition 2nd edition by James Gosling et al and later publications. Equivalent patterns should be applicable in other contemporary programming languages, even though other terms might be used.

One possible implementation pattern is method overloading. One method would accept a reference to a user, an almost identically looking method would accept a reference to an audience.

Another possible implementation is to define a common interface to both user and audience. (That is an option in Java in order to avoid having a common superclass.) Lacking any better suggestions, it could be named "spectator". Both user and audience classes would implement the spectator interface. A method that accepts a reference to a spectator would internally decide what to do differently for a user than for an audience, if it would do anything differently.

Whether invoked via overloaded method or as a method accepting a reference to an implementation of a common interface, two sets of functionalities will have to be implemented: (1) What to do for a user, and (2) what to do for an audience. (This two-way split should be applicable for methods like requestAuthorizationCheck, which are a major concern in designing a system according to the theory and practice of the present invention. Other kinds of methods, e.g. visual rendering or housekeeping, may need multi-way splits e.g. for users, groups, and audiences. Those other splits should be rather easy to recognize, and they aren't considered as fundamental to the theory and practice of the present invention.)

What to do for a user shouldn't be too much of a topic in this disclosure; what should be done essentially is whatever in an access control system has been done for a user.

What to do for an audience is described in this disclosure; one example is in section "Implementation Algorithm".

The order of parameters chosen for a programmatic interface in an implementation should not have to be identical to examples given in this disclosure.

Use Scenarios

Before continuing to section "Visual Representation Of Audience Objects", it seems necessary to outline some use scenarios, in order to make more sense.

Sensing and updating: A computer or a location could be connected to (proximity, gate, fully automatic, operator assisted, or other) sensors which at any time determine the presence of people and their identity. A continuously existing audience object would be modified to add newly arriving people (and to remove departing people). Through an event mechanism all displays of documents should be triggered to update to versions for the newly modified audience object.

Limiting to group: Before a meeting the person who hosts the meeting sets an audience object to include himself and members of an organizational group. He makes the audience object effective for the computer display which will be used during the meeting. During the meeting all information automatically is processed for access by the audience when (before) being displayed. Entrance of people into the meeting room would be controlled in a manner determined by the organization: By knowing people (e.g. a manager knows his employees), aided by user identifying technology (employee badges, electronic tags, code access, etc), or otherwise. Whoever isn't part of the group isn't allowed to enter. If another person would enter (breach for any reason) all document windows would have to be closed or hidden. (If the fire department storms in through the door, one should shut down the computer.)

Document poker: Two organizations are having a meeting. (Either one could send a number of people or a single person.) One organization sets up one of their computers with at least two display hardware units (examples shown in FIGS. 14 and 15, as possible with many contemporary high-end notebook computers 1421 which, if configured correctly, are able to drive an outside display hardware unit 1422 with a separate image 1432, i.e. NOT just a mirror image): One display hardware unit 1422 for everyone 1401, 1411, 1412 in the meeting to see 1432, another display hardware unit 1421 more privately for their own people 1401 only to see (or at least for one of their own people only to see). (Certainly, the other organization could have their own computer(s), with a similar or with a different setup, but for now that isn't of concern to this outline of this use scenario.) Before or when starting the meeting, different display areas are set up, per hardware display, or per windows (or comparable display object) moved into the two hardware displays, each display area with a different audience object associated with it: The more public (to all in the meeting) display area would have an audience object that at least must include all people present at the meeting. The more private display area would have an audience object that might be as limited as the operator of the computer alone (if he can be sufficiently certain to be the only person viewing it, which might be aided by hardware), or maybe the people from his organization present with him, or a similar set. During the meeting for each display area associated with a different audience object all information automatically is processed for access by such respective audience when (before) being displayed.

Check your documents: One specific benefit of this "document poker" setup is that the operator (and whoever from his organization is able to view the more private display area with him, if anyone) can browse and view the entire realm of information (from his organization) which is accessible to him, while at the same time being sure that he will not inadvertently disclose information to the other organization's people who are present, while he also should be able to easily transfer information which he has found in the more private display area from the more private display area to the more public display area, where it still automatically would be processed for access by such respective audience when (before) being displayed. As an example: If his organization has 30,000 pages of research documentation for a new device which they will introduce to market, but only 80 pages have been cleared for access by the other organization, he (and his colleagues if set up for them too) can still view the 30,000 pages, follow a path of reasoning or a path of logic through it, and then point the meeting towards such shared information in the 80 pages which corresponds most to what he has found internally. E.g. hundreds of pages of unpublished (internal use only) ergonomic studies might be summarized in an official paragraph somewhere in the 80 pages (which is ok to show).

Share a document: A beneficial feature for "document poker" would be drag and drop (or other interactive transfer) of documents from the more private display area to the more public display area. Dragging and dropping of windows, URIs, and of indicia for documents are known techniques in the art. With all required software components (relevant access control and GUI APIs) available in such a system already, an implementation should give appropriately private warning to the operator (including an effective block) when he would be dropping a document which the audience of the more public display area isn't authorized to access. Not that they would see it (automatic processing for access by that audience would prevent them from seeing it), but in most situations there should be less potential for consequences in personal or social interaction if there isn't even any perceptible hint at something not being disclosed. Not that those people wouldn't know that they don't get to see everything, but at least they shouldn't be reminded by some "Not Authorized" kind of visual in their display area, if avoidable.

Clear a document for disclosure: Also in "document poker", if (through normal organizational procedures already) authorized to do so for a specific document, the operator could change access control settings for a specific document he can view in the more private display area, which might be what he wants to do and needs to do in order then to display that document in the more public display area.

Remote poker: A setup analogous to the "document poker" setup could be implemented for remote meetings. The operator would have clearly marked display areas: One for himself (or also a "local" audience of people physically next to him) to see, another one for the other party (or parties) to the meeting to see. A number of remote desktop (windowing, document viewing) systems are known in the art, such as NetMeeting, WebEx, etc., all of which are lacking functionality as described in this disclosure.

Approving newcomers: When an audience object has been defined and people (its members) are present at a meeting, then it may occur (by coincidence, by request, for a variety of reasons) that an additional person is being suggested (by someone, possibly by himself) to join the meeting. If approved, similarly as mentioned in the "sensing and updating" use scenario, the audience object should be modified to add the newcomer, and through an event mechanism all displays of documents should be triggered to update to versions for the newly modified audience object. What is presented here, however, is a mechanism to aid (an operator) in deciding whether to approve. For that purpose, a "collection of documents of interest" should be defined (automatically, or under control of the operator, e.g. simply all documents currently on display, or all documents in a directory, or all documents displayed during the meeting so far, or all documents linked from a (prepared) "presentation document" for the meeting, or all documents left yet to be shown as linked from such "presentation document", or all documents that meet certain formulated criteria). That collection could be a single document, e.g. the only document currently on display. Determination should be made of what the differences are (would be) between the collection of documents (and its individual documents with access dependent contents) as processed for access by the existing audience (before approval and addition of the newcomer) versus the documents processed for access by an audience with the newcomer added. One way of making such determination is to fully iterate through all documents. Rather than iterating twice and comparing results (iterating a third time, with potential for overhead in memory use and processor use) it should be more efficient (and less effort to implement) to iterate once and to collect a set of machine-readable descriptions of differences (possibly using references, hence without having to store actual document contents). Using techniques described elsewhere in this disclosure (e.g. dimming of visual appearance), such differences could be presented to an operator in an easily comprehensible and navigable graphical user interface. If the newcomer does not effect any new restrictions in the collection of documents (example in FIGS. 11 to 13) then there would be little interest in viewing differences, and approval of the suggested newcomer would appear to be the most probable action by the operator; optionally such approval under these conditions could be automated. If the newcomer effects any new restrictions in the collection of documents (example in FIGS. 8 to 10) then the operator might without review decide to reject the suggested newcomer; optionally such rejection under these conditions could be automated. Alternatively, if the newcomer effects any new restrictions in the collection of documents then the operator might want to review which information would be affected (documents, and elements which are access dependent contents), which should be facilitated by aforementioned presentation in a graphical user interface. Aided by such presentation the operator might still reject the suggested newcomer. Alternatively, if (before) the operator approves the suggested newcomer, the operator might say a few words of introduction to the existing audience (as present at the meeting), possibly pointing out which items of previously available information the newcomer isn't authorized to access (i.e. what not to talk about once the newcomer will be present). In "document poker" a preferred location for such presentation should be in the more private display area, while allowing the operator to show it in the more public display area could be an option that helps more rapidly clarifying to the existing audience "what not to talk about once the newcomer will be present". As a possible optimization, if a newcomer already is included by the definition of the audience object (yet e.g. the operator hasn't realized that fact) then immediate determination (without iteration through all documents) can be made that he would not effect any new restrictions in the collection of documents, hence enabling a fast track to approval of the newcomer.

Face check: It is possible that an operator is in a meeting with an audience which he personally doesn't know too well. A visual representation of the audience (built into the user interface for displaying documents, collapsible, expandable, foldable, with progressive disclosure) could help the operator in making sure only people are present who should be, which would be specifically helpful in case there isn't strict physical (facility, room) access enforcement in place. Photographic likenesses of those included by the audience object, in a like manner as aforementioned patent application Ser. No. 10/802,658 describes for access control settings, would be highly beneficial, specifically if any other representation (groups, roles, etc) would be transformed into a corresponding set of individual users only. Further, a representation of the audience using photographic likenesses and name labels (possibly with features of progressive disclosure, including but not only with popup hints) could help the operator in personally addressing those who are present. In "document poker" a preferred location for such representation of the audience should be in, with, or near the more private display area, while allowing the operator to show it in, with, or near the more public display area could be an option.

Combined features: A "remote poker" setup could be in effect at the same time as "sensing and updating" or "approving newcomers" locally. Among other considerations, an implementation should make sure to add any local newcomer to audience objects for remote displays as well if they can see local facsimiles of remote displays. (It wouldn't be a success at hiding information on the local display if visible right next to it a facsimile of a remote display shows something the newcomer shouldn't see. For "document poker" in general it should be beneficial in an implementation to have extra code to make sure that at any time anyone who is included by the audience of the more private display area also is included by the audience of the more public display area.) Another possible combination could be two or more remotely linked meeting rooms with "sensing and updating" or "approving newcomers" each.

Encoding Unauthorized Users into a Document

When sending a document in XML to an operator it is possible to add information (in a dedicated namespace, possibly as attributes) which for some elements tells who else wouldn't be authorized to access that element (due to processing of access dependent contents). Such information shouldn't be added all the time. It would make sense, however, to add such information in "document poker" when the operator is known (or has indicated) to be in a meeting (or to be preparing for a meeting) with another audience than the audience for which the document has been processed in its currently presented instance. Caution might prescribe to limit the circumstances when such information actually would be added. Such information if provided then wouldn't always have to be displayed, but it can be sent for optional display.

One possible display is to dim the visual appearance (lighter text, gray background, etc) of elements which anyone else (among that other audience) wouldn't be authorized to access. Another possible display, specifically attractive in combination with the aforementioned, is at the mouse cursor hovering at an element to have a popup hint to display those who wouldn't be authorized to access that element. One specific benefit of such features would be to enable the operator to more easily determine whether he could have a better meeting at a later time when certain people would be excluded from the audience (would leave the meeting, would not come to another meeting).

Instead of encoding references to individual users, references to data structures which could be stored or retrieved separately could be encoded. Appropriate access control for such information should be ensured as well.

Instead of encoding who isn't authorized, in some instances it may be more beneficial to encode who is authorized, specifically if that would be a much smaller number of users.

Instead of encoding such information into a document it could be transmitted separately instead.

Visual Representation of Audience Objects

Visual representation of access control settings is described in aforementioned patent application Ser. No. 10/802,658 and in aforementioned patent application Ser. No. 11/308,636. Audience objects are similar to access control settings in that they reference users (and possibly groups, roles, etc). Many pieces of code for implementations of visual representation of access control settings should be reusable or adaptable for visual representation of audience objects. This should be true for display of individual users, groups, etc, for arrangement of collections of users, groups, etc, including but not only progressive disclosure, folding, collapsing, expanding, etc, as well as for placement of (access control settings or audience) displays relative to documents, to document contents, or to abstractions of documents and of collections of documents.

Because of the great visual similarity (of access control settings vs. audience objects), it might be beneficial to define and (at least within a system) consistently apply one or several visual clues which would remind an operator whether he is viewing or interacting with access control settings or with an audience object. (Making changes to one instead of the other could break intended access control.) Color, background patterns, frame patterns, icons, and font variations are some of the available options. Modern graphic libraries (e.g. Java 2D Grahpics, or SVG) allow better implementations of visual clues (e.g. a specific pattern in the upper left corner of a frame for a display area) than some apparent favorites in the art in past years (e.g. use of bold or italic font, and tables of low resolution icons the meanings of which seem neither to be easy to figure out nor easy to remember). Consistent application could best be enforced by embedding into core libraries. Common or recognizable potentially erroneous manipulations could be caught by code (hard coded or with an expert system) and the operator interactively could be asked to confirm.

As one possible space saving measure, if (as commonly) the operator is a member of the audience (commonly the operator can see all screens), optionally the operator could be omitted from some visual representations of the audience.

Preview Mode

The concept of preview of what other users can see through access control has been illustrated in aforementioned patent application Ser. No. 11/308,636. Ser. No. 11/308,636 FIGS. 17 and 20 illustrate creating access dependent contents; Ser. No. 11/308,636 FIGS. 18, 19, and 21 illustrate preview mode; Ser. No. 11/308,636 FIG. 22 illustrates underlying XML.

Similarly, but differently in some details, an operator should be enabled to preview what an audience will see. This should be possible any length of time (days or months) before a meeting (ideally supported in a system by persistence of an audience object), or a moment (a second) before letting them see (e.g. in "document poker").

In order to simplify some thoughts and code, the operator himself could (in theory and in implementation) be considered being an audience with himself the only member.

Sometimes (in "document poker") it makes sense not only to compare what the operator would see versus what an audience would see, but to compare what an operator's side's audience (e.g. the operator and his coworkers from his own company) would see versus what the other side's audience (e.g. several other companies' people) would see.

For comparative preview of information (a document) for two (or more) audiences there are at least the following possible visual appearances: (1) In separate display areas (possibly but not necessarily next to each other) regular rendering after processing for access by each audience; (2) In one location in one display area a single rendering of the information (the document) (either to its fullest extent as accessible to the operator, or the superset of those of its sections which are accessible to the respective audiences) with visual modifications that could be considered to be highlighting or marking of sections which aren't equally accessible to all audiences.

One possible visual modification is to dim the visual appearance (lighter text, gray background, etc) of sections which a specific audience wouldn't be authorized to access.

In actual use, simple cases may be occurring most frequently. The most frequent case of previewing might be comparing the operator by himself versus an audience. Then the only visual modifications would be for sections which the audience wouldn't be authorized to access.

Actually, there could be three views in (and previews for) a meeting: The other side's audience, the operator's side's audience, and the operator himself. In order not to become incomprehensible, however, implementations might want to limit themselves to two views by default.

Having three meaningful points of view isn't all that far fetched, as this example illustrates: Company C1 makes and sells technical product to company C2. Managers M1 of C1 and M2 of C2 schedule a meeting. They recognize that they will have to bring in engineers E1 of C1 and E2 of C2 to discuss technical issues. In previewing his "collection of documents of interest" for the meeting, M1 notices that his own colleague E1 (in compliance with C1 policy) doesn't know how much C1 charges C2 for the product. M1 therefore knows that he will have to have any price related discussions with M2 at another time, when E1 isn't present. This illustrates that it can be important for an operator not only to consider what he himself will see and what the other side's audience will see, but also to consider what difference will be effected by his own side's audience (other than himself).

Lifetime of an Audience Object

The following thoughts have been developed while thinking in terms of Java, as defined in The Java Language Edition 2nd edition by James Gosling et al and later publications. Equivalent patterns should be applicable in other contemporary programming languages, even though other terms might be used.

An audience object might start to exist when an operator starts preparing for a meeting. At the same time the operator might define a "collection of documents of interest", e.g. in order to be able to perform a preview (possibly aided by an automatic or a semiautomatic "preview auditing" tool).

Sometime after the meeting is over the audience object might cease to be referenced by any other object and hence sooner or later it should be garbage collected.

Essential information of an audience object (which probably should include its definition, i.e. who are its members) also might be stored permanently (e.g. serialized into a file or other storage); the audience object might cease to exist; and at a later time (even on another machine) another audience object might be created by reading such essential information from permanent storage, whereby the latter audience object to the operator (and for many practical purposes) essentially would be the same audience.

Through permanent storage it should be possible at a much later time (e.g. months later) to determine who had been defined to be the audience at a meeting, presuming essential information of the meeting itself has been stored permanently (in a file, database record, or other storage).

Audiences Commonly Don't Write

Audiences commonly read all together at the same time. People sit in rooms and all look at the same screen. Making changes (requiring write access) commonly still is an operation performed by a single operator. One person at a time (at the one keyboard he uses) types changes.

For the sake of clarity and responsibility, in architecting an implementation, one might want to limit audiences to be given read access only. Making changes (having write access)

probably should remain tied to an individual. For this kind of decision then an audience with a single member could be considered like an individual.

This section isn't meant to say collaboration is impossible. It merely suggest one possible architectural choice to limit cost of implementation, at the same time being conservative about protecting data.

If an audience would be allowed to make changes then one possible real world problem could be that people's sense of responsibility diminishes, if there appears to be more room for the excuse "someone else did it". Admittedly, one could allow an audience to make changes and still log which user has made the change. Then that seems to be quite similar to or to be the same as giving individuals write access, so one might as well stick with "individuals" for access control for "writing".

Logging Individuals

While logging could be done with one entry for a complete audience, it appears that in many cases "traditionally" logging individual accesses would be preferred.

When logging for an audience it should be useful to consider two different sets: (1) The set of those who have been defined to be in the audience, who are authorized to access. (2) The set of those who actually are or who have been viewing the display (or who are otherwise accessing the document's information). Less formally: Set 1 are the people who have been approved to attend; set 2 are the people who actually have shown up for the meeting.

When logging with one entry for a complete audience, membership in the audience should be permanently recorded. This should be specifically advantageous when an audience object is "being used" repeatedly.

An advantage of logging with one entry for a complete audience could be less storage requirements, e.g. for an internal meeting which shows a presentation comprising more than a thousand individual resources to more than ten thousand employees of a corporation.

A disadvantage of logging with one entry for a complete audience could be increased computational effort to look up who has accessed a resource, whether someone has accessed a resource, and what resources someone has accessed.

Design decisions should be made under consideration of projected use as well as implementation costs versus requirements of accuracy.

Groups and Roles

In case for an audience object the definition of membership includes a reference to a group or to a role then some users who aren't directly referenced by the audience object data structure still could be represented by the audience object via that group or role.

Test Suites

One area to pay attention to when designing systems according to the theory and practice of the present invention is the risk of incorrect implementation of access control due to erroneous optimizations, or even simply due to incorrect changes being made in evolving code.

Test suites should be put into place to help making sure each new system version correctly handles a broad set of cases. APIs and GUIs can be tested separately. Specialized tools for both kinds of tests are available in the art, and experienced professionals have spent years with respective tools.

There always has been need for quality assurance, but it has become worth mentioning even more when something like audience appears to be inviting additional optimizations, or simply adds another layer to the decision-making logic.

Hardware Support

There appears to be a vast realm of possible hardware support for the present invention. Examples include machine-controlled gates, id sensing gates, proximity sensors, various forms of machine-readable personal identification, automatic recognition of people, effective private displays etc. Some more intricate designs might be possible e.g. to support "remote poker" with guaranteed enforcement of attendance limitations, with sufficiently secure (encrypted) information transfer, and with added extras such as secure voice or video conferencing.

Where this disclosure shows an external monitor attached to a computer, one could alternatively imagine some other output device connected by an appropriate (secure) data transfer mechanism.

Device Driver Support

With operating systems becoming more object oriented, device drivers might appear for display devices that support the present invention by associating with a display device an audience, and providing information about such audience to (sufficiently authorized) software that asks for it.

A library (which could be part of an operating system or could come with a widely used programming language) could take it on itself to enforce matching up of all sending of rendered documents to such display devices with prior automatic processing for access by its audience.

Application programs written on a platform which by default uses such library could enjoy great certainty that all documents appropriately will be limited to audiences; with even more significant certainty (that the audience object corresponds to actual people present and accessing the information) if the audience associated with the display device effectively is guaranteed to be enforced by hardware (e.g. biometric identification of those present combined with limited visibility of the physical display device, e.g. an iris scan combined with closed display goggles).

Implementing GUI

At least FIGS. 16 to 30 show examples of GUI enabling an operator to control a system, and enabling an operator and an audience to actually see documents.

For the inventor, having spent more than 20 years implementing various innovative GUI on various platforms, it is tempting to say: "Just implement it." (A blueprint for a house doesn't come with too many instructions either.) Then there are some points worth mentioning:

Whether to implement at the operating system level (Microsoft Windows, Linux, others), or at an equivalent library level (Java), or otherwise, should be a decision influenced not only by (business) goals, but also by development team familiarity with and effective and continuing accessibility of relevant bodies of source code of the systems to integrate with.

Handling Complex Decision Trees

For an implementation, use of a rules engine (or of a number of instances of a number of rules engines) can be an essential ingredient to success, including but not only to delivering within budget on time, being able to accommodate a variety of future specification changes (possibly in external systems and interfaces) within budget on time, being able to deliver acceptable results for seemingly mind-boggling complex scenarios, etc.

A rules engine should help making decisions what to do when rules seem applicable yet a responsible programmer would have to say "this is too much for me to think through all possible combinations or to remember".

There appears to have been a great amount of inconsistent use of language in literature, in products, and in product documentation regarding rules engines. This disclosure tries to follow chapter 6, Definitions, of Java Rule Engine API JSR-94, version 1.0.

Inputs to a rules engine for an implementation of the present invention could include coordinates of display units, coordinates of windows, audience membership lists, results of comparisons of documents, preference settings (per installation, per system, or per user), and many others.

Different rules in different rule execution sets could represent different preference settings per implementation.

Actions could include but shouldn't be limited to user interface (e.g. allow drag and drop; present a dialog box to inform, to confirm a choice, or to ask for a decision; display a specific user interface element to indicate an operation is prohibited, e.g. an animated reddish pattern; display or don't display portions of document contents; etc), getting specific versions of documents from a server, or others.

Drools documentation reads it "is a Rules Engine implementation based on Charles Forgy's 1982 Rete algorithm tailored for the Java language." It answers the question: "Why should you use a Rule Engine?" with "Rule engines are a great way to collect complex decision-making logic and work with data sets too large for humans to effectively use. A rule engine can make decisions based on hundreds of thousands of facts, quickly, reliably and repeatedly. It works by decomposing large sets of rules into a very efficient network of nodes which can process and react to facts far more efficiently than can be programmed manually. A Rule engine scales extremely well, almost linearly, with increases in rules and facts." Further it reads: "Rule based approaches lend themselves very well to declarative programming techniques and allow for data/logic separation . . . making it very obvious what it does, not how it does it, thus making it easier to manage extremely complex decision making processes."

Display Properties GUI

Something similar to FIG. 17 has been available in several versions of the Macintosh operating system for many years, before OS X, the Monitors control panel.

The present invention doesn't require a specific method of getting from FIG. 18 to FIG. 19. Options could include such distinct methods as dragging likenesses of users, or entries being added as triggered from hardware devices that determine the presence of people.

The details of FIGS. 18 and 19 have been chosen for their continuity from FIG. 17 and their relative obviousness. Alternatively, similarly as there have been a number of accessories (Control Strip items, menus, small applications, icons) for the Macintosh operating system and for Windows which inform about and allow change of display resolutions without using much screen space or without using many other resources, one could implement small areas on the computer screen (e.g. at either margin) which similarly in little space (possibly with progressive disclosure) inform about and allow change of (display area or) display unit related access control settings (e.g. registration of users as an audience). If doing so, the theory and practice of the present invention suggests being considerate about displaying certain meta-information in certain display areas; e.g. not to remind people in an audience of their status giving them limited access rights, e.g. not to let people in certain audiences know the exact set of people in the audience. (In other words: Certain kinds of meta-information should not be put into more public display areas, even if it applies to the very display area.)

Once People are Registered

Once an infrastructure has been put into place to register people to view display units then such information which is available about audiences (and people in audiences) could be used for purposes beyond processing "access dependent contents" (as shown in this disclosure and in aforementioned patent application Ser. No. 10/802,658 and Ser. No. 11/308, 636) for any data, documents, and resources. Information about audiences could be made available at least via an application programming interface.

An example scenario could be a doctor in conferences with support staff and patients. The role "nurse" might not be allowed to see a patient's credit card number, even role "doctor" might not be allowed to see a patient's credit card number (which could be implemented requiring computation beyond processing "access dependent contents" as shown). Maybe more controversially, by some rule (which could be implemented requiring computation beyond processing "access dependent contents" as shown) the role "patient" might not be allowed to see certain information.

In this scenario, information about an audience should be retrieved, e.g. via an application programming interface, for necessary computations.

The present invention contributes at least that one can register users to view display units, that it can be done and verified easily, that it can be done and verified visually, and the concept of audience (consisting of more than one person).

Workaround for Backwards Compatibility

Ideally, the concept of audience should be incorporated into all parts of newly designed systems as appropriate. For some time to come, however, it may occur that some data, documents, or resources are controlled by software, servers, or serverlike software that don't understand the concept of audience. Then at least one possible strategy for getting some functionality of the present invention for such data, documents, or resources is to perform extra computation on the client side (or whatever it may be called), before actually displaying anything. One client-side algorithm could be: Send the server requests for the document for each person who is in the audience. (Other than sending a request for the document for the audience, this might require authentication for each user, which might mean additional cost.) Then compare the documents received as responses. If all equal then display, else if able to determine greatest common portions of content then display those, else (if unable to determine greatest common portions of content) then don't display (e.g. treat as (collectively) not authorized).

Documents are Structured

It may be useful for some to be reminded that as information organized (in files) in directories for some time has been considered (described) as being in a tree (files in directories), then further the concept of a tree (structure) exists inside documents. Specifically for markup language, a known concept is a document object model and its tree. At least some common or similar thinking about both kinds of trees, both in processing and in user interface, should have benefits in understanding, implementing and appreciating the present invention. The veins in a leaf are similar to the branches of a tree (its tree), they are part of the same organism, they branch out.

Good user interface should appear integrated, like a tree "is one", even if things have to be done a little bit differently for restricted parts of a document versus for whole restricted documents (being part of a body of documents).

That said, it may also be useful to mention again: Probably most of the time it is better not to remind people of what they aren't allowed to access.

Less than Perfect can be More Affordable

An implementation should not always have to allow the maximum logically allowable access. It should be acceptable sometimes to deny access because a case it too complex to be affordable, its complexity either requiring excessive computation or requiring excessive coding.

Without wanting to set an actual mark, a possible example could be the decision for an implementation that (other than for a simple audience) multiple documents inside one window are too hard to deal with accurately.

Another possible example (of avoiding some potentially complex coding) could be the decision that if a user isn't allowed to see (read) all of a document then automatically that user isn't allowed to edit (write) the document at all, even if another rule would allow the user to edit (write) what is accessible (to that user).

Serverlike Software

If this disclosure creates the impression that the present invention requires a server to make decisions about access to resources, then it should be mentioned that it does not require a dedicated hardware server, but merely serverlike software. In the art, systems exist in which server and client software run on the same hardware, other systems exist in which server software runs on several hardware units, and there have been and certainly will be efforts to run truly decentralized (even heterogeneous) serverlike software.

The essence of a "server" for the present invention should be that it is an entity which gives access to resources only in response to requests with appropriate parameters.

Less than Perfect Enforcement

The present invention can be useful even if at some time only less than perfect mechanisms are in place e.g. to keep track of actual attendance, and to physically restrict others from viewing; it probably will become more useful each time better mechanisms are put into place.

Other Rendering

While much of the wording of this disclosure appears to be about visual displays, the theory and practice of the present invention should be equally applicable to other renderings of information, e.g. to aural rendering, e.g. by text-to-speech software. Another possible rendering would be (automatic) translation to another human language. Information to be rendered in any possible way (including but not only aurally or translated) automatically should be processed for access by the audience when (before) being rendered.

Connecting Cultures

Good implementations of the present invention should function well for communication among people whose native languages are different. Many of its features are language neutral, and GUI implementations should lend themselves well for different localizations nevertheless seamlessly accessing the same resources.

Search Results

The result of a (Web or local) search often is expected to be a list of references (hyperlinks), with more or less extracted information readily displayed with each reference.

It appears practical that in context with the present invention each such search result list automatically should be filtered for the audience registered to view the display unit on which it will be rendered.

When users have come to expect a certain number of items to be listed, it could trouble users if a list is too short. More results could automatically be requested from the search server (software), until the expected number of items passes filtering. Alternatively, in a well-integrated (probably at first in-house) system, a search server could be implemented to understand the concept of audience, to respond with a filtered list already, hence to avoid a back-and-forth of extra requests and responses.

Interestingly, even an external search server (software) could insert appropriate markup language, even without knowing anything about users and audiences at the client side, e.g. adc:itemsOnlyIfRefs="true". When entering an organization through some kind of proxy, firewall, etc, essentially when going through another server that knows about users and audiences at the client side, then such markup language could be processed to achieve the desired filtering. Further, that proxy (firewall, etc) actually could do the desired filtering even if such specific markup language wouldn't have been inserted, but for that it would have to know (more about) what kind of list to be looking for.

Whom to Trust

Recurring thoughts in working with the present invention are: "How far do you allow information to travel? Whom do you trust? What machine should be doing how much computation?" These thoughts influence what appears reasonable and feasible. In a very strict environment the server does all reduction of information, which costs server CPU time etc. In a less strict environment one trusts client software to perform necessary reduction of information, i.e. what is in the client machine's memory but is not displayed would still be considered protected, safe, and confidential.

The question whether to do certain things on the server side or on the client side has been around in many incarnations over many years. To err on the safe side, information in transfer should be protected at all times. If the client side is a sealed or certified computer in a doctor's office then maybe it is ok to trust it with information, other than if the client side can be anywhere. Or, with spyware in existence, maybe it isn't safe to trust any machine but the server.

Almost everything related to security is easier in closed organizations. Almost everything related to security is easier in smaller installations. Backwards compatibility can lead to increased security risks.

The present invention doesn't fundamentally increase risks. It can, instead, make a variety of tasks both easier and safer.

Outlook

Contemporary businesses will find great benefits from using the present invention if they want to compete in times when best handling of information is a necessity, an essential ingredient of success, yet often has become an increasing expense, and too much of an administrative burden.

REFERENCES

Document Object Model (DOM) Level 2 Specification, W3C Working Draft
Extensible Markup Language (XML) 1.0 (Second Edition), W3C Recommendation
The Java Language Edition, 2nd edition, James Gosling et al.
Programmer's Guide to the Java 2D API, Java 2 SDK, Standard Edition, 1.2, Sun Microsystems, Inc.
Scalable Vector Graphics (SVG) 1.1 Specification, W3C Candidate Recommendation
Web Services Activity, at the World Wide Web Consortium website
Some Guidelines For Deciding Whether To Use A Rules Engine, by George Rudolph, at the Jess home page, at the Sandia National Laboratories website
Java Rule Engine API JSR-94, version 1.0, Sep. 15, 2003
Drools is a Rules Engine implementation, released through the JBoss Community website

What is claimed is:

1. A method for conditionally for a predetermined audience displaying or not displaying a predetermined digital document from a data storage hardware device, comprising the steps of:

(a) accessing a definition of an audience identifying a plurality of users; and (b) for an individual instance of read access to a digital document, in a body of digital documents stored in a digital computer system with access control system, by said audience allowing said read access only if for each individual user effectively identified by said definition of said audience an individual determination of whether to allow equivalent read access would be to allow said equivalent read access, an operation equivalent to and implementable by logical AND, also known as logical conjunction; and (c) if and only if allowing said read access then displaying said document on a visual display unit hardware device.

2. The method of claim 1, wherein said audience can be defined at will by a human operator.

3. The method of claim 1, wherein said document is a Portable Document Format document.

4. The method of claim 1, wherein said document is a photograph.

5. A digital computer system comprising at least:
(a) a processing unit
(b) connected to memory,
(c) furthermore connected to a data storage hardware device, and
(d) a plurality of visual display unit hardware devices;
(e) means for associating at least one of the visual display unit hardware devices with an audience comprising a plurality of users; and
(f) means for filtering digital documents by applying the method of claim 1 for said audience before rendering said documents on such associated visual display unit hardware device.

6. The system of claim 5, further comprising means for on at least one of the visual display unit hardware devices graphically representing the users included by the definition of said audience.

7. The system of claim 5, wherein rendering of documents on such associated visual display unit hardware device is exclusively limited to documents processed by part (f).

8. The system of claim 6, wherein a user is graphically represented by a display element comprising, at least in part, a likeness of the user.

9. A digital computer system comprising at least:
(a) a processing unit
(b) connected to memory,
(c) furthermore connected to a data storage hardware device, and
(d) one or more visual display unit hardware devices;
(e) means for associating at least one display region on at least one of the visual display unit hardware devices with an audience comprising a plurality of users; and
(f) means for filtering digital documents by applying the method of claim 1 for said audience before rendering said documents into such associated display region.

10. The system of claim 9, further comprising means for on at least one of the visual display unit hardware devices graphically representing the users included by the definition of said audience.

11. The system of claim 10, wherein a user is graphically represented by a display element comprising, at least in part, a likeness of the user.

12. The system of claim 9, further comprising a simultaneously visible display region for representation of documents as authorized for the operator alone.

13. The system of claim 9, further comprising another display region for representation of documents that have been filtered by applying the method of claim 1 for a smaller subset of said audience, which also includes the operator.

14. The system of claim 9, further comprising means for visually indicating for a set of documents which parts of it would be denied to be visible if displaying said set of documents by applying the method of claim 1 for a superset of said audience while in contrast they would be allowed to be visible for said audience alone, if any.

15. The system of claim 9, further comprising means for visually indicating which subset of users from a superset of said audience would cause for a set of documents a difference between authorization for said superset in contrast to authorization for said audience alone, if any.

16. The system of claim 9, wherein said audience is determined by means of biometrics.

17. The system of claim 9, wherein said audience is determined by means of machine-readable personal identification.

18. The system of claim 9, wherein changes to the presence of people trigger updates of the filtering and rendering as needed for correctness.

19. The system of claim 9, wherein sensed changes to the presence of people automatically trigger updates of the filtering and rendering as needed for correctness.

20. A method for conditionally for a predetermined audience displaying or not displaying elements of access dependent contents of a predetermined document from a data storage hardware device, comprising the steps of:
(a) accessing a definition of an audience identifying a plurality of users; and
(b) for read access to an element of access dependent contents in a digital document, stored in a digital computer system with access control system, by said audience allowing said read access only if for each individual user effectively identified by the definition of said audience an individual determination of whether to allow equivalent read access to said element would be to allow said equivalent read access to said element, an operation equivalent to and implementable by logical AND, also known as logical conjunction; and
(c) if and only if allowing said read access then displaying said element on a visual display unit hardware device.

21. A digital computer system comprising:
(a) a processing unit
(b) connected to memory,
(c) furthermore connected to a data storage hardware device, and
(d) one or more visual display unit hardware devices;
(e) means for associating at least one display region on at least one of the visual display unit hardware devices with an audience comprising a plurality of users; and
(f) means for in such associated display region displaying resulting contents of a digital document processed by the method of claim 20 for access by said audience.

22. The system of claim 21, further comprising means for concurrently displaying resulting contents of said digital document processed by said method for access by another audience.

23. The system of claim 22, wherein said other audience is a superset of said audience.

24. The system of claim 21, further comprising means for displaying visual modification of those elements of said resulting contents of said digital document to which read access wouldn't be allowed if processed by said method for access by another audience.

25. The system of claim 24, wherein said other audience is a superset of said audience.

26. The system of claim 21, further comprising means for visually indicating which subset of users from a superset of said audience would cause for elements of said document a difference between authorization for said superset in contrast to authorization for said audience alone, if any.

27. The system of claim 21, wherein said audience is determined by means of biometrics.

28. The system of claim 21, wherein said audience is determined by means of machine-readable personal identification.

29. The system of claim 21, wherein changes to the presence of people trigger updates of the filtering and rendering as needed for correctness.

30. The system of claim 21, wherein sensed changes to the presence of people automatically trigger updates of the filtering and rendering as needed for correctness.

31. A method for determining whether a specific newly joining user would cause a difference in what documents from a data storage hardware device a predetermined audience would be allowed to access for display on a visual display unit hardware device, comprising the steps of:
   (a) accessing a definition of an audience identifying one or more users; and
   (b) determining the logical value whether of a predetermined collection of digital documents, stored in a digital computer system with access control system, for at least one document of said collection a requested read access would be denied for said audience if said audience would be modified to include a specific potentially newly joining user while in contrast read access for the same one document would be allowed for said audience if left unmodified, which means without said potentially joining user.

32. The method of claim 31, wherein said logical value is used to decide whether for said potentially newly joining user to allow or to deny joining a meeting.

33. The method of claim 31, wherein said logical value is used to automatically decide whether for said potentially newly joining user to allow or to deny joining a meeting.

34. The method of claim 31, in addition collecting identifying information about such documents of said collection for which read access would be denied for said audience if said audience would be modified to include the specific potentially joining user while in contrast read access would be allowed for said audience if left unmodified.

35. The method of claim 31, in addition if read access would be denied then on a visual display unit hardware device rapidly alerting a human operator.

36. The method of claim 35, in addition making available to said human operator identifying information of such documents of said collection for which read access would be denied for said audience if said audience would be modified to include the specific potentially joining user while in contrast read access would be allowed for said audience if left unmodified.

37. The method of claim 31, wherein said documents comprise Portable Document Format documents.

38. The method of claim 31, wherein said documents comprise photographs.

39. A digital computer system comprising at least:
   (a) a processing unit
   (b) connected to memory,
   (c) furthermore connected to a data storage hardware device, and
   (d) one or more visual display unit hardware devices;
   (e) means for associating at least one display region on at least one of the visual display unit hardware devices with an audience comprising a plurality of users; and
   (f) means for performing the method of claim 31 for a specific potentially newly joining user.

40. The system of claim 39, wherein said potentially joining user is identified by means of biometrics.

41. The system of claim 39, wherein said potentially joining user is identified by means of machine-readable personal identification.

42. The system of claim 39, wherein said logical value is used to decide how to operate a machine controlled gate.

* * * * *